Aug. 15, 1961 O. K. KELLEY 2,995,955

TRANSMISSIONS

Original Filed Dec. 26, 1952 8 Sheets-Sheet 1

Inventor
Oliver K. Kelley
By Willits, Helwig & Baillio
Attorneys

TRANSMISSIONS

Original Filed Dec. 26, 1952

8 Sheets-Sheet 2

Inventor

Oliver K. Kelley

By

Willits, Helwig & Baillio

Attorneys

Aug. 15, 1961 O. K. KELLEY 2,995,955

TRANSMISSIONS

Original Filed Dec. 26, 1952 8 Sheets-Sheet 3

Inventor
Oliver K. Kelley
By Willits, Helwig & Baillio
Attorneys

Inventor
Oliver K. Kelley
By Willits, Helwig & Baillio
Attorneys

Aug. 15, 1961 O. K. KELLEY 2,995,955

TRANSMISSIONS

Original Filed Dec. 26, 1952 8 Sheets-Sheet 5

Inventor
Oliver K. Kelley
By Willits, Helwig & Baillio
Attorneys

Aug. 15, 1961 O. K. KELLEY 2,995,955

TRANSMISSIONS

Original Filed Dec. 26, 1952 8 Sheets-Sheet 6

Inventor
Oliver K. Kelley
By Willits, Helwig & Baillio
Attorneys

Aug. 15, 1961 O. K. KELLEY 2,995,955

TRANSMISSIONS

Original Filed Dec. 26, 1952 8 Sheets-Sheet 7

INVENTOR.
Oliver K. Kelley
BY
T. L. Chisholm
ATTORNEY

Aug. 15, 1961 O. K. KELLEY 2,995,955

TRANSMISSIONS

Original Filed Dec. 26, 1952 8 Sheets-Sheet 8

INVENTOR.

Oliver K. Kelley

BY T. L. Chisholm

ATTORNEY

United States Patent Office 2,995,955
Patented Aug. 15, 1961

2,995,955

TRANSMISSIONS

Oliver K. Kelley, Bloomfield Hills, Mich., assignor to General Motors Corporation, Detroit, Mich., a corporation of Delaware Continuation of application Ser. No. 328,090, Dec. 26, 1952. This application July 23, 1958, Ser. No. 750,848
37 Claims. (Cl. 74—677)

This invention relates to hydrodynamic torque transmitting devices, particularly to converters which multiply torque and in which the positions of the blades of one or more of the rotating elements can be adjusted to control the transmission or multiplication of torque.

While the basic three element hydraulic torque converter having blades at fixed angles has been successful and useful within its inherent limitations and has provided reasonable efficiency over relatively short operating ranges of load and speed, and although some success has been had in increasing the efficient operating range through the addition of one or more turbine and reaction elements, inter-element clutching arrangements, refinements of blade design, etc., the attainment of maximum blade efficiency throughout the wide operational range required of automotive vehicles and the like has been prevented by the inability of the fixed bladed elements to fully adapt themselves to the varying fluid flow conditions encountered. Also, blades having fixed angles cannot extend or adjust the range of torque multiplication which it is desirable to effect under different operating conditions. It is, accordingly, the principal object of the invention to overcome these disadvantages by providing a fluid torque transmitting device having blade adjusting means in one or more of its rotary elements and to provide means for controlling the blades in accordance with changes in speed and load demands on the transmission.

Another principal object of the invention is to provide such a transmission in which the blade shifting is effected by a power actuated member which controls the application of power to itself in response to the adjusted position of the blades.

As one example, which incorporates various aspects of the invention, an embodiment is described and shown comprising a hydraulic torque converter having an impeller, two turbines and a reaction or stator element in the fluid circulating path. Certain features, however, of the individual blades elements, their relation to each other and to the transmission output shaft and their control means are applicable to hydrodynamic torque transmitting devices generally. Thus, the invention has among its other more specific objects to provide a hydraulic torque converter with adjustable reaction blades and/or adjustable turbine blades; to provide a transmission in which the torque delivered by the impeller is absorbed in varying proportions by two turbines in the fluid circulating path, with one of the turbines having blades variable in pitch with change in speed of the other turbine; to provide a transmission having an adjustable bladed tu rbine geared to the transmission output shaft through the output shaft driving connection of a fixed bladed turbine; and to provide a dual turbine transmission thus geared having means for controlling the gear drive ratio of an adjustable bladed turbine relative to that of a fixed bladed turbine.

The means by which these and other objects of the invention are attained will be more readily understood from thoe following description of a preferred embodiment thereof, having reference to the drawings wherein:

FIGURES 1 and 1*a* collectively form a structural longitudinal section of a transmission embodying the features of the present invention, and showing the hydraulic torque converter and planetary gear train associated therewith.

*General arrangement*

Figures 1, 1A:
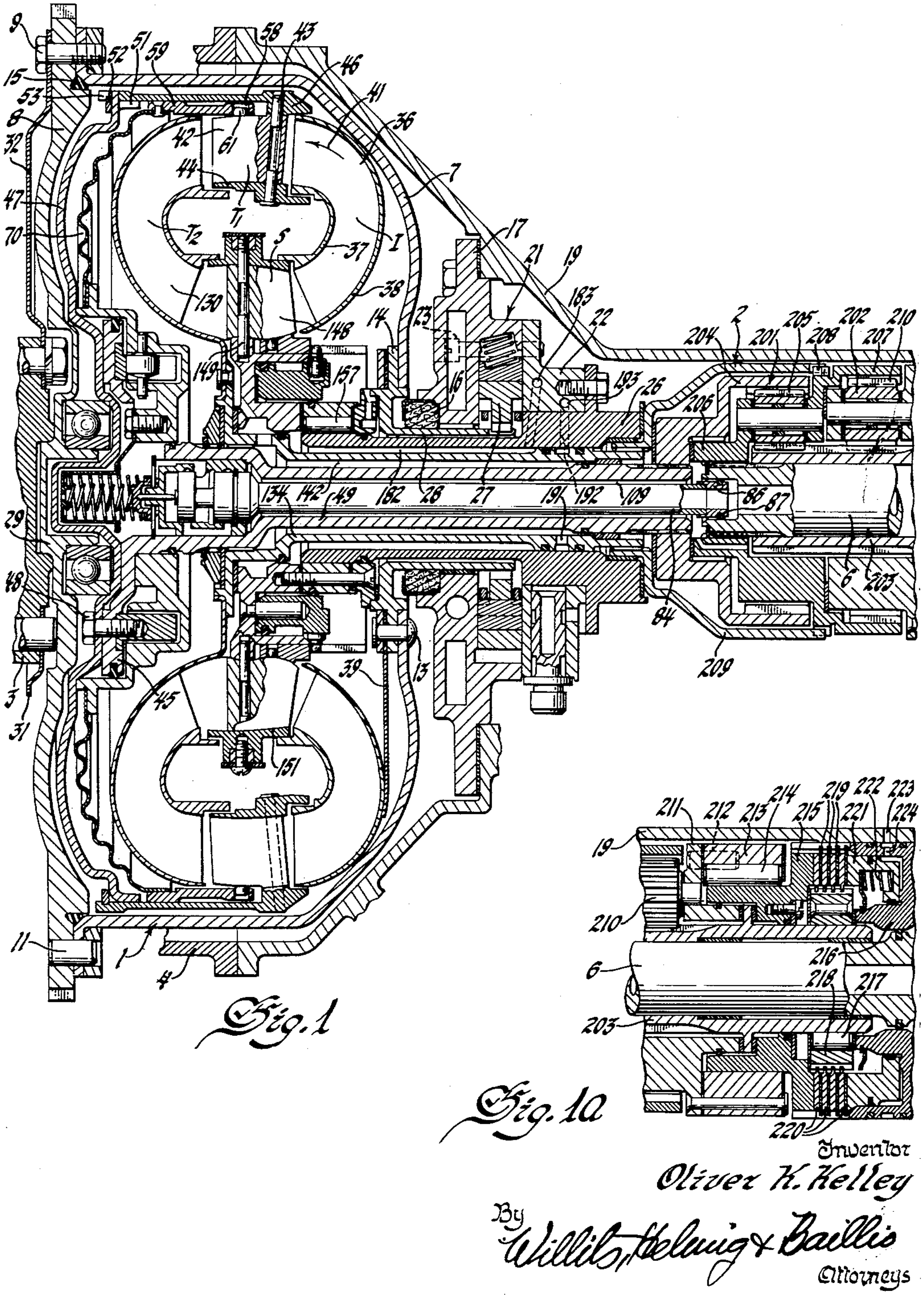
Figure 25:
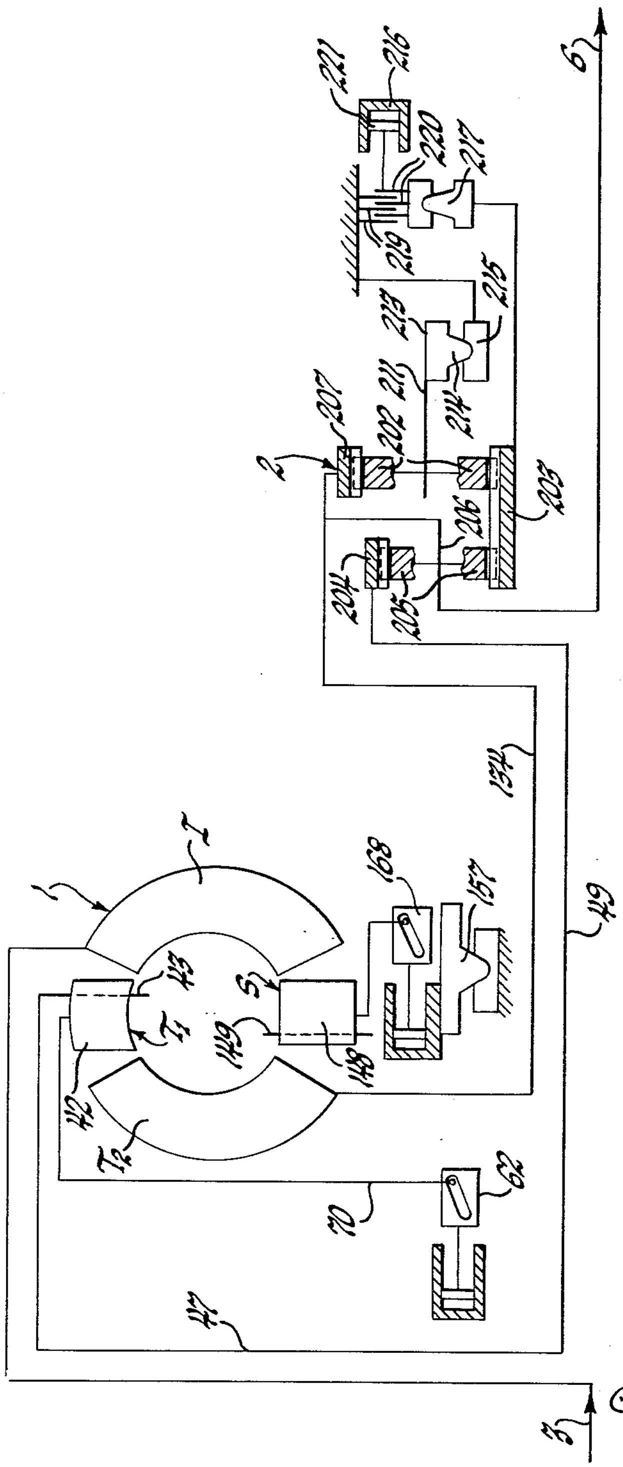
FIGURE 25 is a diagram of the transmission showing the relationship of the elements in one half of a generally symmetrical longitudinal section.

Referring to FIGURES 1 and 25, a torque converter indicated generally by 1 is driven by an engine shaft 3 and drives a reduction gear unit 2 which drives an output shafto 6 which may be the propeller shaft of an automobile. The torque converter includes an impeller I driven by the engine, a first turbine T–1, a second turbine T–2 and a reaction element or stator S. Turbine T–1 is connected to a hollow shaft 49 which drives an input ring gear 204 forming part of a front planetary gear set including a reaction sun gear 203 and planetary gears 205 mounted on a carrier 206 connected to the output shaft 6. The reaction gear 203 can rotate forward, but is prevented from rotating backward by a ratchet device 217 when a forward drive torque establishing device 219—220 is set by any suitable hydraulic chamber 216.

Turbine T–2 drives an input ringe gear 207 larger in diameter than the ring gear 204 and forming part of a rear planetary gear set including an extension of the sun gear 203 and planetary gears 202 mounted on a carrier 211 connected to the outer race 213 of a one-way torque establishing device having a ratchet member 214 which prevents reverse rotation with respect to a stationary inner race 215 connected to the frame of the transmission. The ring gear 207 and second turbine T–2 are connected to the front carrier 206 and therefore to the output shaft 6.

The blades 42 of first turbine T–1 are mounted on pivots 43 so that the blade angles can be changed by means of a rotary diaphragm 70 which can be rotated by a cam ring 62 as will be explained. The blades 148 of the stator S are mounted on pivots 149 so that the blade angles can be adjusted by means of a cam ring 168 forming part of a hub which supports the stator for forward rotation, but only forward, about a stationary tube or ground sleeve 26. Reverse rotation of the stator is prevented by any suitable one-way device represented by the ratchet 157 between the hub and the ground sleeve.

*Operation of schematic arrangement*

Rotation of the impeller circulates liquid through the turbines and reaction member in the known manner to impress torque on the turbines. For low gear start and automatic two-stage drive, the cylinder 216 is vented to release the brake 219—220. On starting, torque is impressed simultaneously on T–1 and T–2 but as will be explained, higher torque is initially impressed on T–1 than on T–2. This drives ring gear 204 forward impressing forward torque on the carrier 206 and reverse torque on the sun gear 203. Because the carrier is initially held by the inertia of the car, the sun gear rotating backward rotates the rear planets 202 forward and impresses forward torque on the ring gear 207 and reverse torque on the carrier 211. The carrier is prevented from rotating backward by the one-way device 214 and this exerts forward torque on the ring gear 207. Because the rear ring gear 207 is larger in diameter than the front ring gear 205, the rear ring gear is turned forward by the sun gear 203 at a speed reduction with respect to the sun gear which is greater than the speed multiplication from the front ring gear 205 to the sun gear. This alone tends to drive the output shaft at a slower speed than T–1 or tends to multiply the torque of T–1. However, in addition, the forward rotation of the front carrier 206 (which is the fulcrum or reaction point in the backward drive of the sun gear 203 by T–1) reduces the speed of the sun gear which further reduces the speed of the output shaft and further multiplies the torque of T–1 transmitted to the output shaft. This compounds the two planetary gear sets and provides the lower of two possible ranges of speed ratios which is equivalent of the higher of two possible ranges of torque ratio.

Rotation of carrier 206 by the first turbine T–1 positively drives the second turbine T–2 and the ring gear 207 forward, which is permitted by the rear planetary gear set because the ratchet device 214 permits the carrier 211 to rotate forward freely.

As car speed increases, hydraulic torque on T–1 progressively diminishes and torque on T–2 progressively decreases and T–2 tends to increase in speed so that eventually it tends to rotate the carrier 206 faster than it is being rotated by the turbine T–1. When this occurs, the second turbine T–2 drives the output shaft 6 by direct connection through the carrier 206 due to hydraulic torque impressed on the turbine T–2 by the oil circulating by the impeller I. Rotation of the carrier 206 faster than it can be driven by the turbine T–1 is permitted by the ratchet device 217.

In order to start the car at a higher speed ratio and also to provide automatic two-stage drive, the brake 219—220 is set. The first turbine T–1 drives the ring gear 204 forward and impresses reverse torque on the sun gear 203, but because the sun gear cannot rotate backwards, due to the one-way device 217 and the brake 219—220, this drives the carrier 206 and the output shaft 6 forward at a speed ratio which is higher than the speed ratio of the two planetary gear sets compounded as described above. This also positively rotates the second turbine and ring gear 207 as described above which forward rotation is permitted by the ratchet device 214. When the speed of the second turbine tends to drive the carrier 206 faster than the first turbine can drive it, the second turbine takes over the drive as explained above and the first turbine freewheels, this freewheeling being permitted by the ratchet device 217.

The torque transmitting characteristics of the torque converter may be changed and particularly the range of torque multiplication may be increased by changing the positions of the movable blades 42 and 148 as will be explained.

*Representative structure*

FIGURES 1 and 1a show one form of actual structure of a transmission embodying the invention. Referring to these in detail, the transmission is shown as including a torque converter indicated generally by the numeral 1 and a gear reduction unit indicated generally by the numeral 2. At 3 is the end of rotary driving shaft such as a crankshaft of an automobile engine whose outer frame or housing is partially shown at 4. The power from the crankshaft is delivered through the torque converter 1 to the gear reduction unit 2, thence to the transmission output shaft 6 which may be the propeller or drive shaft of the automobile.

The torque converter shown is a four-element multiple turbine type including a driving impeller I, first and second turbines T–1 and T–2, respectively, hydraulically driven by the impeller I, and a reaction element or stator S. These converter elements are contained in a shell or housing 7, closed at its forward end by a cover 8 whose outer margin is bolted as at 9 and doweled as at 11 to a flange provided on the shell 7. The outer edge of the torque converter cover 8 may be provided as shown with external starting gear teeth. Compressed between the flanged end of the torque converter shell 7 and cover 8 is a neoprene O ring or other suitable gasket 15. The right end wall of the shell 7 is secured by rivets 13 to the flanged forward end of a pump drive sleeve 14 which extends rearwardly through the opening and is sealed by a packing element 16 to the fixed annular plate 17 which is bolted to the transmission outer casing 19 which connects at its front end to the engine housing 4 and has its rearward end enclosing the gear reduction unit 2.

The plate 17 forms the front and radially outer walls of housing for a pump indicated generally by the numeral 21, the rear wall of the housing being an annular ring 22, generally L-shaped in radial section bolted to a fixed sleeve 26 extending concentrically through and radially spaced from the rotatable sleeve 14. The pump 21 has a driving rotor 27 splined to sleeve 14 within the housing formed by the fixed plate 17 and fixed ring 22. The other constructional details of this pump 21 form no part of the instant invention, and may take various forms. Such other details of the pump 21 are fully disclosed in the U. S. Patent 2,805,628, Herndon et al., filed April 1, 1950, issued September 10, 1957. This pump draws the hydraulic fluid from a suitable sump (not shown) and delivers it under pressure into the converter shell 7 through the annular clearance space 28 defined by the sleeves 14 and 26. A fluid outlet path, to be later described, is provided for the return of the fluid from the converter to the sump, and by providing suitable pressure regulating means either in the pump 21 or in the return path the converted shell 7 is continuously maintained full of fluid at substantially constant pressure during engine operation.

The converter shell 7 and cover 8 are supported and driven by the engine crankshaft 3 through a boss 29 in a recess in the rear end face of the crankshaft, and a spider having its hub 31 bolted and doweled to the crankshaft and its arms 32 secured at their outer ends to the converter cover 8 by the bolts 9.

The impeller I, comprising vanes or blades 36 secured between an inner shroud 37 and an outer shell 38, is connected to rotate with the shell 7 as by a plurality of radiating straps, one of which is shown at 39, welded or otherwise fixed to the impeller outer shell 38 and attached as by the rivets 13 securing the shell 7 to the sleeve 14.

The blades 42 of turbine T–1 are pivotally supported for angular adjustment about axes substantially parallel to and adjacent their leading edges by journalling pins 43 which are secured at their opposite ends in inner and outer members 44 and 46. The outer shell 46 of T–1 extends forwardly and is splined at its front end to the outer peripheral edge of a driving disk 47 which is secured as by bolts 48 to a driving flange 45 on the forward end of an inner torque transmitting shaft or tube 49. The shaft 49 is one of the output or driven shafts of the torque converter and is one of the driving shafts or input shafts of the gearing 2. The rearwardly extending tabs 51 which are bent down in forming the inter-spline recesses of the disk 47, have a close fit in the outer member 46. At 52 is an outwardly expanding snap ring which abuts the front face of the disk 47, maintaining the splines of this disk fully seated in the inter-spline recesses of the outer member 46, and engages inwardly presenting grooves provided in the splines 53 of the member 46.

Figure 2:
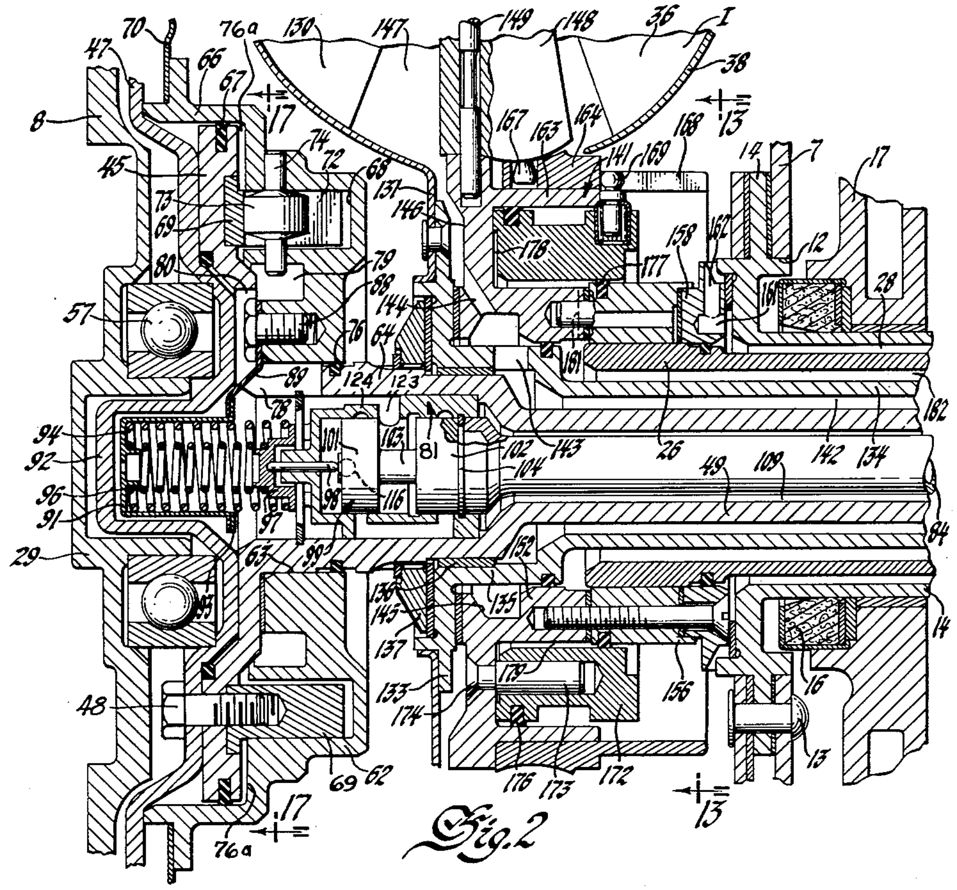
FIGURE 2 is an enlarged fragmentary view similar to FIGURE 1 showing the turbine blade and stator blade pitch controlling means in greater detail.

As best shown in FIGURE 2, a radial and thrust bearing 57 is mounted between the converter cover 8 and the T–1 drive disk 47.

Rotatably and slidably fitting inside the T–1 turbine outer shell 50 is a control ring 59 (FIGURE 1) having holes 58 in which are journalled projections 61 on the outer ends of the blades 42 to maintain the angular positions of the blades 42. Rotation of the control ring 59 relative to the turbine shell changes the angles of the blades. The forward end of the control ring 59 is riveted to a torsionally stiff but axially resilient corrugated diaphragm 70, the center of which is fixed to a turbine control cylinder 62 which slides on drive flange 45 which also forms a piston.

Figures 17, 18, 19:
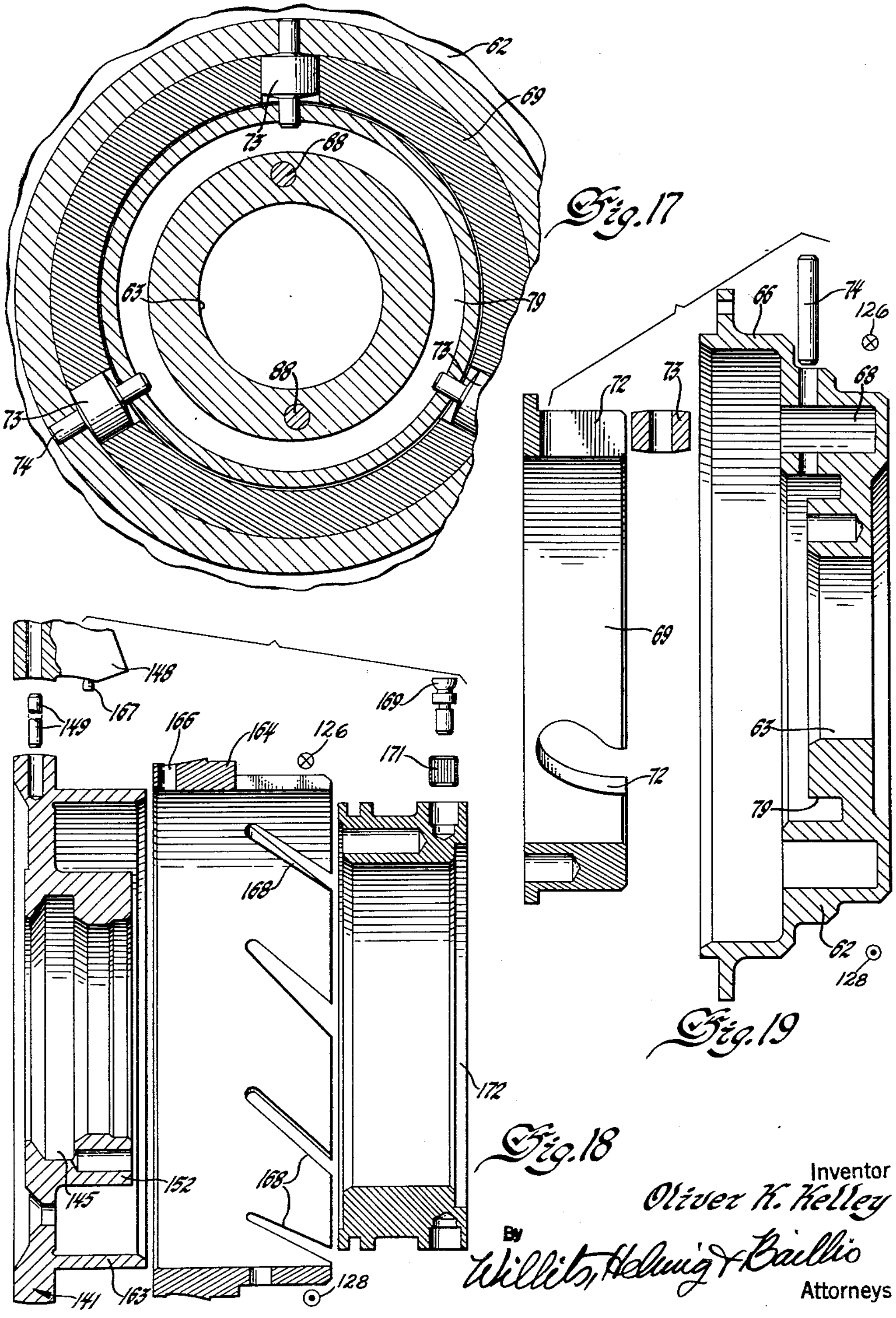
FIGURE 17 is a sectional view taken substantially on lines 17—17 of FIGURE 2 showing further details of the turbine blade shifting means.
FIGURE 18 is an exploded view showing the principal parts of the stator blade adjusting means in longitudinal section.
FIGURE 19 is an exploded view of the turbine blade shifting means showing the principal parts in longitudinal section.
Figure 20:
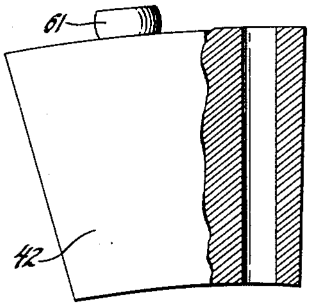
FIGURES 20, 21 and 22 are enlarged elevational views of one of the adjustable turbine blades with portions broken away and in section.
Figure 21:
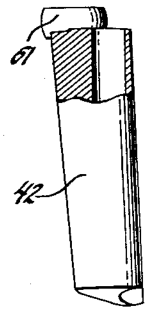
Figure 22:
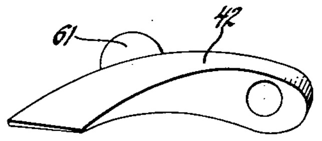

As best shown in FIGURES 2, 17 and 19, this cylinder 62 has a bore 63 slidably fitting on a valve housing 64 formed integral with the driving flange 45 and shaft 49. The cylinder side wall 66 can slide and rotate with respect to piston 45 which is fitted with a pressure sealing ring 67. A forwardly presenting annular recess 68 is provided in the cylinder end wall, into which extends a cam ring 69 fixed to the driving flange 45 by the bolts 48. A plurality of circumferentially spaced helical cam slots 72 are formed in the cam-ring for rollers 73 which are journalled on pins 74 in the cylinder 62. A seal ring 76 (FIGURE 2) is mounted in an external groove on the outer periphery of the valve housing 64 for sealing engagement with the cylinder end bore 63. This provides an expansible hydraulic chamber 76a for controlling the pitch of T–1 blades. When the chamber is supplied with oil under pressure it moves the cylinder 62 to the right as FIG. 1 is seen, against the pressure in the converter chamber, to rotate the cylinder 62 and control ring 70 and increase the angle of the T–1 blades by moving them toward the position 42″ shown in FIG. 23.

Figure 3:
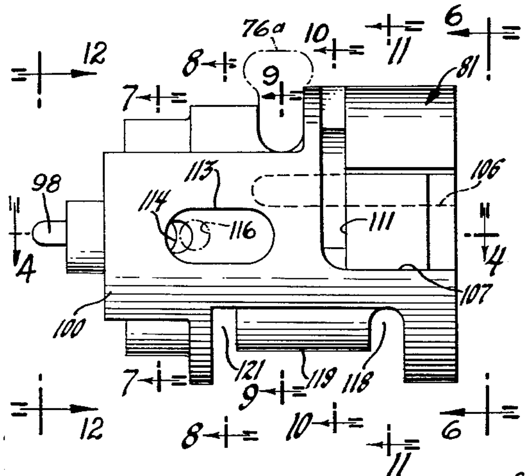
FIGURE 3 is an enlarged elevation of the valve body for the turbine blade pitch controlling means corresponding to the section shown in FIGURE 2.

The valve housing 64 has an opening 78 adjacent its forward end which connects hydraulically with control chamber 76a through slot 80 in flange 45 and annular groove 79 formed in the end wall of the cylinder 62 to establish communication between the valve housing and the control chamber 76a. Secured in the tube enlargement 64 is a bushing forming a turbine control valve body 81, shown in detail in FIGURES 3 and 4. Fitted into its open rear end is a fluid supply pipe 84 which extends concentrically through the drive shaft 49 and makes a fluid connection with the interior of the hollow output shaft 6 (FIG. 1). T–1 blade control fluid, for supply to chamber 76a which may be introduced by any suitable means (not shown) to the interior of the hollow output shaft, is thus conducted to the rear end of the valve body 81 separately from the converter fluid conducted into the converter shell through the pump discharge space 28. Any suitable means of sufficient capacity and pressure, such as the pump 21, may be employed as the source of this separately conducted T–1 control fluid, and in FIGURE 24 to be later described there is illustrated a control system for regulating the pressure at which this T–1 control fluid is maintained in the output shaft in accordance with the output torque and speed demands on the transmission. Since their functions and operating pressures differ from each other these fluids will be distinguished hereinafter in the description by designating that which enters the valve body from the pipe 84 as the turbine-control-fluid, and that which is conducted by the annular space 28 to the converter shell as the converter-fluid. The space 109 between pipe 84 and the inner driving tube 49 serves as a return passage for conducting to the transmission sump the turbine-control-fluid when it is exhausted or vented from the chamber 76a. The connection of the pipe 84 to the output shaft may be made, as shown in FIGURE 1, in the form of a ferrule 86 fixed to the rear end of the pipe 84 and extending into a counterbore in the forward end of the output shaft 6. A suitable seal 87 in the form of an O-ring of neoprene or the like is provided which is retained in a groove about the periphery of the ferrule 86 for engagement with the output shaft counterbore.

Figure 4:
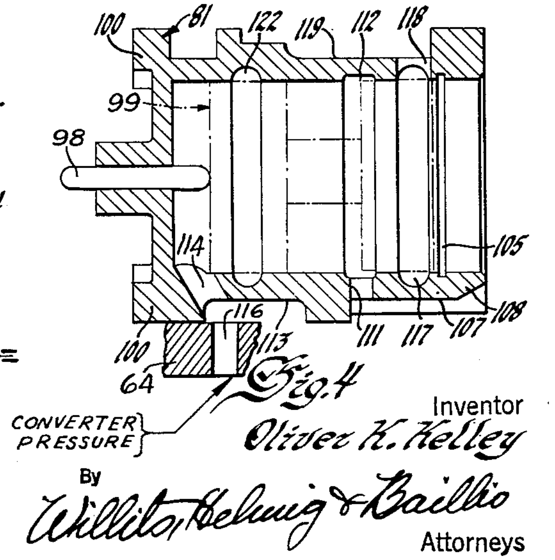
FIGURE 4 is a sectional view of this valve body taken substantially on line 4—4 of FIGURE 3.
Figure 12:
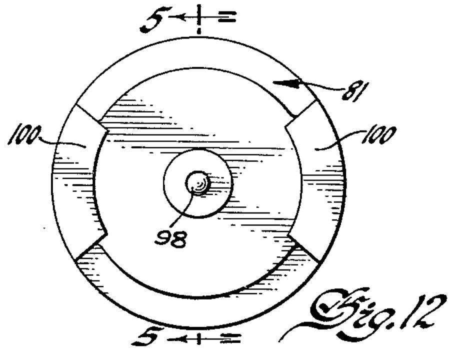
FIGURE 12 is an end elevational view of this valve body taken from the left of FIGURE 3.

Fixed to the cylinder 62 as by bolting at 88 is a valve biasing spring housing support in the form of a bracket 89 supporting a cup-shaped spring housing 91 disposed in the torque converter cover 47. Seated in this cup are two helical compression springs 94 and 96 whose rear ends abut a hat-shaped retainer 97 which bears against a push rod 98 which urges the valve 99 rearwardly. Rearward travel of the spring retainer 97 is limited by a pair of diametrically spaced abutment pads 100 formed integrally of the valve body, as best shown in FIGURES 4 and 12.

The valve 99 is of the spool type, having the front and rear pistons or lands 101 and 102 separated by a groove and interconnected by a stem 103. The valve 99 when open, that is, placed toward the left as FIG. 2 is seen, connects the T–1 control cylinder 76a to a source of oil under variable pressure, which tends to increase the angle of the T–1 blades, and when closed, that is, placed to the right as FIG. 2 is seen, vents the control cylinder, which decreases the angle of the blades, as will be explained. The springs 94 and 96 and the pressure in the converter constantly urge the valve closed to decrease the angle of the T–1 blades, and the force of the springs increases as the angle of the blades increases due to movement of the cylinder 66 on which the springs are supported. The control pressure, when admitted to the face of the land 102 urges the valve open to increase the angle of the blades. The force of the springs 94 and 96 normally holds the valve closed with its rear end against a snap ring 104 in an internal groove 105 (FIGure 4) in the valve body.

Figures 5, 6, 7, 8, 9, 10, 11:
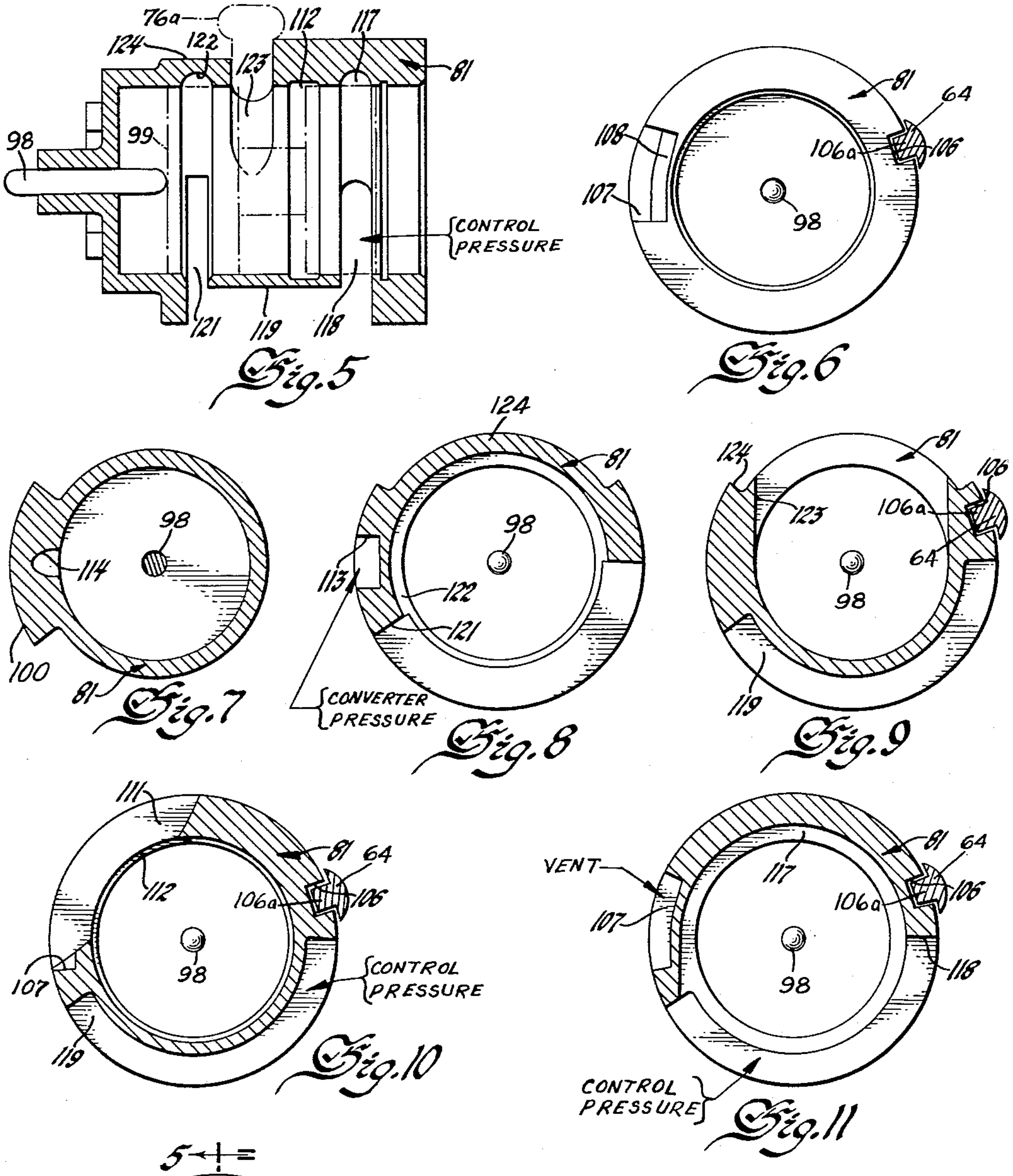
FIGURE 5 is a sectional view of this valve body taken substantially on line 5—5 of FIGURE 12.
FIGURE 6 is an end elevational view of this valve body taken from the right of FIGURE 3.
FIGURES 7, 8, 9, 10 and 11 are sectional views taken substantially along similarly numbered lines of FIGURE 3.

The valve 99 serves to meter the flow of turbine-control-fluid from the pipe 84 through the valve body to the control chamber 76a. To provide separate passageways for the control and converter fluids into and out of the valve body bushing, its internal and external surfaces are shaped as best shown in FIGURES 3–12. At its rear end, as will be seen from FIGURE 6, the outer surface of the valve body has a longitudinally extending keyway 106 and a longitudinally extending turbine-control-fluid vent slot 107, the bottom rear extremity of the latter being chamfered as at 108 (FIGURES 4 and 6) to provide a conduit to the return passage 109 (FIGURE 2) between the pipe 84 and the tube 49. Keyway 106 engages a projection 106a (FIGURE 6) provided on the valve housing 64 to maintain the valve body in its proper angular relation with the tube 49. The slot 107 extends forwardly to connect with a radial exhaust or vent port 111 (FIGURE 4) cut through the side wall of the valve body and connecting with an internal annular vent groove 112 in the valve body. Formed in the external surface of the valve body forward of the slot 107 is a longitudinally extending converter pressure supply groove 113 (FIG. 3) which is connected to the forward end of the valve body bore in front of valve land 101 by a hole 114. The rear end of the groove 113 registers with a converter pressure supply hole 116 (indicated in broken outline in FIGS. 2, 3 and 4) extending through the wall of the valve housing 64, and into the working space of the torque converter, whereby the front face of the front piston end 101 of the valve 99 is subjected at all times to converter-fluid pressure. Behind the annular vent groove 112, as shown in FIGURE 5, the valve body bore has an annular turbine-control pressure supply groove 117 which is connected by a radial port 118 to a groove 119 extending forwardly along the outer surface of the valve body to a control pressure inlet port 121. The latter port, in turn, leads inwardly through the valve body side wall to an annular inlet groove 122 in the bore of the valve body just back of the converter-fluid passage 114. Between this last mentioned inlet groove 122 and the vent groove 112 which connects with the turbine-control-fluid return slot 107, the valve body bore has a control cylinder port 123 which leads radially outward to an external longitudinal groove 124 (FIGS. 3, 5, 9) extending forwardly along the valve body outer periphery and communicating with the opening 78 in the valve housing 64 (FIGURE 2) which leads to the control chamber **76*a*. The widths of the annular grooves 112, 117 and 122 and their axial spacing relative to each other, are so dimensioned with reference to the lengths and axial spacing of the valve piston ends 101 and 102 that as the valve is moved forwardly from its closed position of abutment with the stop ring 104 the rear annular supply groove 117 will be uncovered first by land 102, followed by covering of the exhaust or vent groove 112 by land 102 slightly in advance of the uncovering of the front inlet groove 122 by land 101. As a result, the pressure of the turbine-control-fluid acting on the front faces of the cylinder 62 is at all times directly responsive to the pressure in the supply pipe 84**.

It will thus be seen that when turbine-control-fluid is introduced at sufficient pressure to the interior of the output shaft, this pressure acting against the rear face of the valve rear piston 102 causes the valve to open by moving forward against the biasing force of the springs 94 and 96 to connect the inlet port 121 to the cylinder **76*a* and close the exhaust port 111 to let fluid flow from the supply pipe 84 through the valve body to the front faces of the cylinder 62. This pushes the cylinder 62 rearwardly and (by reason of the camming action of the rollers 73 in the helical slots 72) rotates it in a clockwise direction (as viewed in FIG. 17 or from the right of FIGURE 1) relative to the driving disk 47 and the core members 44 and 46 of the turbine T–1. This is represented by the arrow in FIG. 17 and by the symbols 126 and 128 in FIGURE 23. Symbol 126 represents the view of the feathers of an arrow flying directly away from the observer which indicates that the part adjacent the symbol is moving away from the observer toward the space behind the plane of the paper of FIGURE 19. Symbol 128 represents the view of the point of an arrow flying directly toward the observer and indicates that the part adjacent the symbol is moving toward the observer, that is toward the space in front of the plane of the paper. Either of the symbols, or the two together, represent that the entire cylinder 62 is rotating clockwise, as viewed from the right of FIGURE 19, relative to the element of reference, which is the driving disc 47. Rotation of the cylinder 62 in this direction relative to the core members 44 and 46 is, in turn, transmitted through the diaphragm 70 to the control ring 59, causing the blades 42 to pivot in a counterclockwise direction as viewed in FIGURE 23 from their low angle setting shown in solid lines toward a maximum angle setting indicated by the broken outline 42''. The rearward movement of the bracket 89 and spring housing 91 with the cylinder causes the springs 94 and 96 to increase the biasing force on the valve, which urges the valve toward closed position with increased force. Thus the valve is kept balanced by the pressure in one direction of the turbine-control-fluid acting on the rear face of the valve rear piston end 102 and the force of the converter pressure and the force of the springs 94 and 96 in the opposite direction. For any selected turbine-control-fluid pressure therefore, there exists a corresponding stabilized angular setting of the T–1 turbine blades 42**.

Also acting against the rear faces of the cylinder 62, in opposition to its rearward movement in response to the turbine-control-fluid pressure as just described, is the pressure of the converter-fluid within the shell 7 and cover 8. Compensating at least in part for this converter-fluid pressure effect on the cylinder 62, and also serving to neutralize or substantially neutralize changes therein, is the force exerted by the converter-fluid pressure on the front face of the valve front piston end 101. Subjection of this face of the valve to the converter fluid pressure is constantly effected through the passages 116, 113 and 114 as previously described.

The blades 130 (FIGURES 1 and 2) of the second turbine T–2 are rigidly interconnected by inner and outer members, similar in manner to the blades 36 of the impeller I. The outer member of this turbine terminates in a radially inwardly extending web portion 131 which is riveted to the driving flange 133 of an outer tube 134. The tube 134 is the second output or driven shaft of the torque converter and is also the second input or driving shaft for the gearing. Adjacent its flange 133 this tube has an enlargement 135 which encompasses the rear portion of the inner tube enlargement 64 and is rotatably journalled thereon by a sleeve-like bearing 136. Forwardly of the outer driving tube flange 133 is a thrust ring 137 encircling and splined to the inner tube enlargement 64, and between the flange 133 and the thrust ring 137 is a thrust bearing washer. The thrust ring 137 is located against forward displacement by a snap ring mounted in an annular groove provided in the externally splined section of the inner tube enlargement 64. The rear face of the outer tube flange 133 bears against a thrust washer which separates and accommodates relative rotation between this flange and the hub 141 of the stator S.

The outer tube 134 has its internal diameter sufficiently larger than the otuside diameter of the inner tube 49 to provide an annular space 142 therebetween which serves as a return passageway for the converter-fluid flowing from the torque converter. Connecting passages 191, 192 and 193 (FIGURE 1) lead out from the rear end of this space 142 through the outer tube 134, fixed sleeve 26 and pump cover 22, respectively, to the sump via suitable cooling means (not shown). Converter-fluid leaving the converter flows to this annular space 142 through ports 143 and 144 provided in the outer tube enlargement 135 and stator hub 141, as shown. Continuous communication between these ports is effected by an annular groove 145 provided on the inner periphery of the hub 141, and the front face of the latter is annularly grooved at 146 to conduct the converter fluid from the space 147 between the blades 130 of the second turbine T–2 and the blades 148 of the stator S.

The reaction blades 148 are pivotally supported for angular adjustment about axes substantially parallel to and adjacent their leading edges by pins 149 which are secured at their opposite ends in the hub 141 and inner member 151, in a manner generally similar to the angularly adjustable blades 42 of the first turbine T–1. The hub is generally annular and has its radially innermost cylindrical wall 152 fixed to the outer race 156 of a one-way brake of conventional design having rollers or sprags 157 (FIGURE 1) which prevent backward rotation of the stator with reference to the fixed sleeve. Also mounted to rotate with the stator hub 141 and brake race 156 is a rear thrust ring 158 which bears on a bearing washer seated against the flanged front end of the pump drive sleeve 14. This rear thrust ring is provided with connecting drilled recesses 161 and 162 through which the converter-fluid flowing through the annular clearance space 28 from the pump 21 may enter the interior of the converter shell 7.

The radially outermost cylindrical wall 163 of the stator hub 141 is formed with a cylindrical external surface for rotatably supporting a stator blade control ring 164 having radially extending holes 166 (FIGURE 18) therein adjacent its forward end which receive projections 167 on the outer ends of the stator blades. The rear end of this member 164 is provided with a plurality of circumferentially spaced helical slots 168 (best shown in FIGURE 18) into which extend the ball ends of studs 169 whose shanks are suitably journalled and retained end-wise in needle bearings 171 pressed into recesses provided therefor in the outer periphery of an annular piston 172. The walls 152 and 163 of the hub 141 define an annular cylinder for the piston. Dowels 173 extending into drilled recesses in the front face of the piston and anchored as by screws 174 to the web of the hub 141 serve to slidably support the piston 172 and prevent its rotation relative to this hub. Suitable packing rings 176 and 177 are mounted on the outer periphery of the piston adjacent its front end and on the outer periphery of the clutch race 156 just forward of the rear end of the piston, as shown in FIGURE 2, to effect a fluid tight seal. Provision is made for introducing hydraulic fluid under pressure to the front end of the piston by forming the front face of the latter with an annular relief groove 178 which connects with an annular clearance space 179 between the piston and the inner wall 152 of the core member, which latter clearance space, in turn, is connected by one or more radial slots 181 (FIG. 2) cut in the rear face of the inner wall 152 to the annular clearance space 182 between the sleeves 24 and 26. Entrance of the hydraulic fluid to this inter-sleeve space 182 is effected through passage 183 (FIGURE 1) leading to the rear end thereof through the fixed sleeve 26 and pump cover 22. The pump 21 may also serve as the source of this fluid which will hereinafter be designated the stator-control-fluid, and in FIGURE 24 to be later described there is illustrated a suitable means for controlling the admission of this fluid to the passage 183 in accordance with the output torque and speed demands on the transmission.

Figures 13, 14, 16:
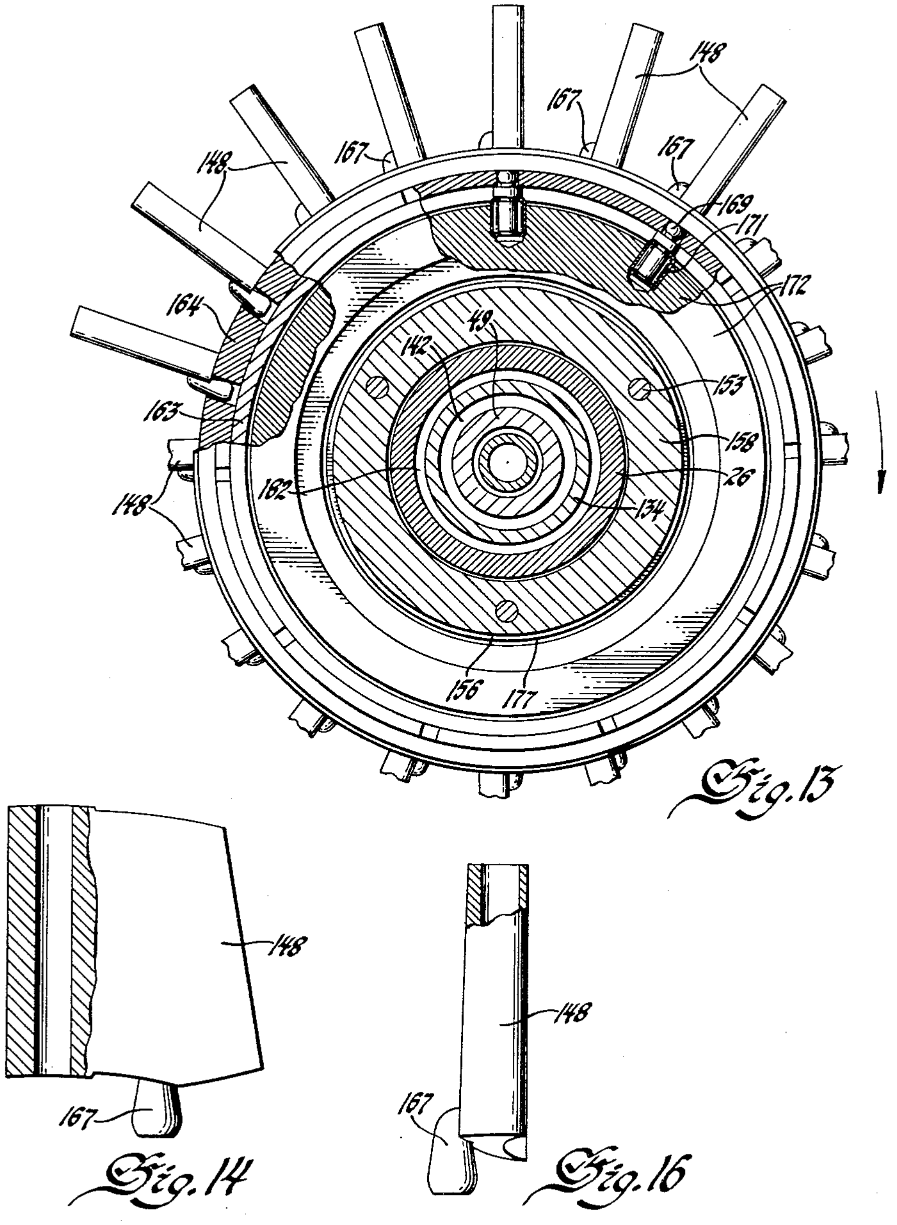
FIGURE 13 is a fragmentary sectional view taken substantially on line 13—13 of FIGURE 2, showing further details of the stator blade adjusting means.
FIGURES 14, 15 and 16 are enlarged elevational views of one of the adjustable stator blades, with portions broken away and in section.
Figure 15:
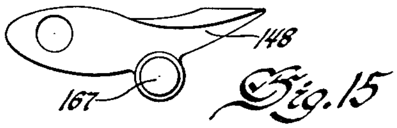
Figure 23:
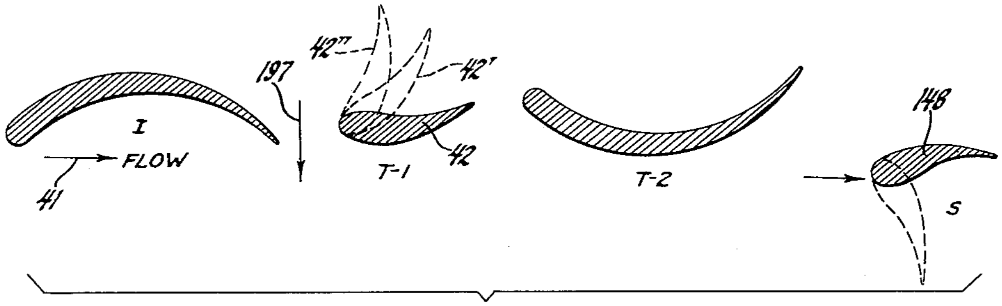
FIGURE 23 is a diagrammatic view of the blade sections of the impeller, two turbines and the stator arranged in their respective relations to the directions of the converter fluid under different operating conditions of the transmission.

By reason of the directional pitch of the helical cam slots 168, (FIG. 18) rearward movement of the piston 172 in response to stator-control-fluid pressure applied to the front face of this piston effects rotation of the control ring 164 in a clockwise direction (as viewed in FIGURE 13) relative to the core member 141, causing the stator blades 148 to pivot from their low angle setting shown in solid lines in FIGURE 23 to the high angle setting shown in broken outline in the latter figure. Opposing such rearward movement of the piston 172 is the force of the converter-fluid pressure acting against the rear face of the piston, and this latter force is sufficient to maintain the piston in its forward or low angle blade position (shown in FIGURES 1 and 2) except when the stator-control-fluid pressure is applied.

The term low angle, as used herein, means that the general direction of the blade makes a small angle with respect to the plane determined by the principal axis of the transmission and the pivot or leading edge of the blade, as is the case with the solid line position of blades 42 and 148 in FIGURE 23. With a blade at high angle the general direction of the blade makes a large angle with respect to this radial-axial plane, as illustrated in the dotted line positions of blades 42 and 148 in FIGURE 23.

As is known in the art, blades at low angle change the direction of oil relatively little, and so effect a relatively low torque multiplication, whereas blades at high angle change through a relatively large angle the direction of the oil between its absolute direction when it strikes the blade, and its absolute direction when it leaves the blade. This produces a relatively large torque multiplication in the converter. The terms low angle and high angle may be considered to be the opposites or complements of the terms low pitch and high pitch in the sense these latter terms are used in the screw thread and propeller arts.

From the description thus far given it will be seen that by reason of the inner and outer tubes 49 and 134 being rigidly connected to the first and second turbines T–1 and T–2, respectively, they each tend to rotate counterclockwise (as viewed from the right of FIGURE 1 and indicated by the arrow 197 in FIGURE 23) in response to rotation of the converter-fluid in that direction with the impeller I and the engine crankshaft 3. As is the case with conventional torque converters, the converter-fluid has a toroidal direction of flow indicated by the arrow 41 (FIGURES 1 and 23) in addition to its rotational movement with the impeller about the axis of the transmission, and the velocity of the toroidal relative to the rotational movement of the converter-fluid increases and decreases with increase and decrease in rotating speed of the impeller relative to the turbines. Also, the stator blades serve in conventional manner to multiply torque by redirecting the converter-fluid to enter the impeller in the counterclockwise direction. The one-way brake 156—157—26 effects this result by preventing the stator from rotating clockwise during the multiplication but permitting the stator to rotate counterclockwise when the fluid flows from the turbine in such direction that it strikes the backs (convex sides) of the stator blades.

The first and second turbines T–1 and T–2 may have their tubes 49 and 134 geared at relatively high and low torque ratios, respectively (as provided for example, in the gear reduction unit 2, to be later described), to the transmission output shaft 6. At stall, i.e., with the engine running and both turbines T–1 and T–2 held stationary by the output load on the transmission, the ratio of toroidal to rotational flow of the converter-fluid produced by the rotation of the impeller is at a maximum. When the car begins to move and as the speeds of the turbines T–1 and T–2 increase relative to that of the impeller, the toroidal flow decreases and the rotational speed of the converter-fluid increases.

The torque absorbed by the turbines in response to impeller rotation is dependent on the relative speed of the impeller and turbine and the angular relation of the blades of the respective turbines to the direction of the converter-fluid entering the turbines. This torque is referred to as the stall torque when it just equals the torque input from the impeller and is insufficient to overcome the output load resisting turbine rotation. The ratio of the impeller input torque to the stall torque—or stall torque ratio—must therefore exceed unity under all operating conditions that require driving the transmission output shaft. By varying the pitch of the turbine T–1 blades, in accordance with the invention, it is possible to vary the stall torque ratio to meet different output requirements of the transmission. Thus as applied to automotive vehicle operation, for example, the turbine T–1 blades may be set at an intermediate-angle (such as indicated by the broken outline 42′ in FIGURE 23) during the initial acceleration, and as the vehicle increases in forward speed with resultant decrease in the stall torque ratio required, the angle of the T–1 blades can be increased as necessary to obtain the desired rate of vehicle acceleration.

During engine idling, the first turbine blades 42 may be set at a maximum angle setting such as indicated by the broken outline 42″ in FIGURE 23. In this position as is known in the art, the blade 42 tends to restrict the volume of oil which can flow through the converter, and the relatively small amount of energy in the converter-fluid leaving the impeller is largely dissipated in shock losses upon striking the blades of the first turbine, with the desirable result that tendencies of the vehicle to creep at engine idle are minimized.

While it conceivably might be preferable for utmost efficiency and performance that the stator blade angle be varied gradually between minimum and maximum settings, satisfactory results have been obtained with the simpler construction and control which provides for the stator blades having only the alternative low angle and high angle settings such as are indicated in solid and broken lines respectively in FIGURE 23. With this arrangement, the low angle setting has been found to give satisfactory performance under all engine operating conditions above idle and at less than full throttle, and also during full throttle road load or cruising operation when it is desired that the torque converter operate simply as a fluid coupling. The high angle setting may, therefore, be reserved only for use in obtaining maximum acceleration at full engine throttle, up to a predetermined cruising speed and for engine idle operation, in which latter instance it serves to impede toroidal flow of the converter-fluid and thereby reduces vehicle creep.

*Gearing*

As shown on FIGURES 1 and 1*a*, the gear reduction unit 2 includes compoundable planetary gear sets 201 and 202 having a common sun gear 203 journalled on the transmission output shaft 6. The front planetary set 201 has an annulus gear 204 splined as shown to the first turbine tube 49 and meshing with planet gears 205 which in turn mesh with the sun gear 203 and are mounted on a carrier 206 which is splined to the output shaft 6. The annulus gear 207 of the second or rear planetary set is shown as formed integrally with the front planet carrier 206 and is directly coupled as by splining at 208 to the second turbine T–2 by a coupling member 209 splined to the outer tube 134. Meshing with the rear annulus gear 207 are a plurality of planet gears 210 which also mesh with the sun gear 203, and have their carrier 211 directly coupled as by pins 212 to the outer race 213 of an over-running brake of conventional form having rollers or sprags 214 and an inner race 215 to the transmission housing 19. The over-running brake 213, 214, 215 permits forward rotation of the second planetary carrier 211 but prevents reverse rotation. Adjacent its rearward end the sun gear 203 forms the inner race of a second overrunning brake having rollers or sprags 217 and an outer race 218 which can be held fast by a fluid pressure controlled brake. As shown, this fluid pressure controlled brake comprises a plurality of fixed disks 219 splined to the fixed cylinder 216 and arranged for frictional engagement with a plurality of driven disks 220 splined to the outer race 218. Arranged within the cylinder 216 is a piston 221 which is urged rearwardly out of clamping engagement with the disks 219 and 220 by a spring 222, but can be moved in the opposite direction in response to fluid pressure within the cylinder 216 to clamp the disks together and thereby lock the outer race 218 against rotation in either direction relative to the housing 19. When the outer race 218 is thus locked against rotation the sprags 217 permit forward rotation of the sun gear but prevent reverse rotation. Suitable communicating passages 223 and 224 are provided in the housing 19 and cylinder 216 for admission of the fluid to actuate the piston 221.

With the fluid pressure controlled brake 219, 220 disengaged and the vehicle at rest, rotation of the first turbine T–1 is transmitted to the output shaft 6 through the annulus gear 204, first planet gears 205, sun gear 203, second planet gears 210 and finally the second annulus gear 207. During this drive the fluid pressure control brake 219, 220 is disengaged, allowing the sun gear 203 to rotate clockwise, and a high ratio of turbine T–1 speed to turbine T–2 speed is permitted. While the turbine T–2 may rotate at a greater speed in proportion to that of the turbine T–1 than is permitted by this ratio, their geared relationship prevents the turbine T–2 from rotating at a slower speed relative to that of the turbine T–1. With increase in speed of the turbine T–2 relative to that of turbine T–1 due to increase in speed of the output shaft which results from reduction of the load as the car accelerates, the over-running brake 213, 214 allows the carrier 211 to freewheel and the second turbine T–2 drives the car alone, as is known in the art, and as explained, for example, in my U.S. Patent 2,803,974 issued August 27, 1957, on an application filed July 31, 1948. When the fluid pressure controlled brake 219, 220 is applied (stopping the sun gear 203 from rotating backward), the rotation of the turbine T–1 provides a single reduction drive of the output shaft through the first annulus gear 204, planet gears 205 and planet carrier 206 the sun 203 being the reaction gear. Torque is also transmitted through the second annulus gear 207 and coupling member 209 to the second turbine T–2. When this drive is in effect the rear carrier 211 freewheels forward, the rear planetary gearset being inactive. The speed ratio between the first turbine T–1 and the output shaft is the higher of the two possible ratios, that is the torque multiplication is the lower. As with the low speed drive, the turbine T–2 may approach the speed of the turbine T–1, this being permitted by the over-running brake 217, 218 allowing the sun gear 203 to freewheel in the counterclockwise direction.

In both high speed and low speed drives, any increase in the speed ratio of the second turbine relative to that of the first turbine T–1 beyond the speed ratio of the gearsets results in the turbine T–1 discontinuing to transmit driving effort to the output shaft 6 and merely being carried in the converter-fluid passing between the impeller I and the turbine T–2. By increasing the pitch of the turbine T–1 blades 42 in accordance with increasing speed of the output shaft 6, however, the rotating speed of the turbine T–1 relative to that of turbine T–2 can be maintained at the ratio determined by the particular gear setting and the first turbine can continue to transmit torque.

*Control*

Figure 24:
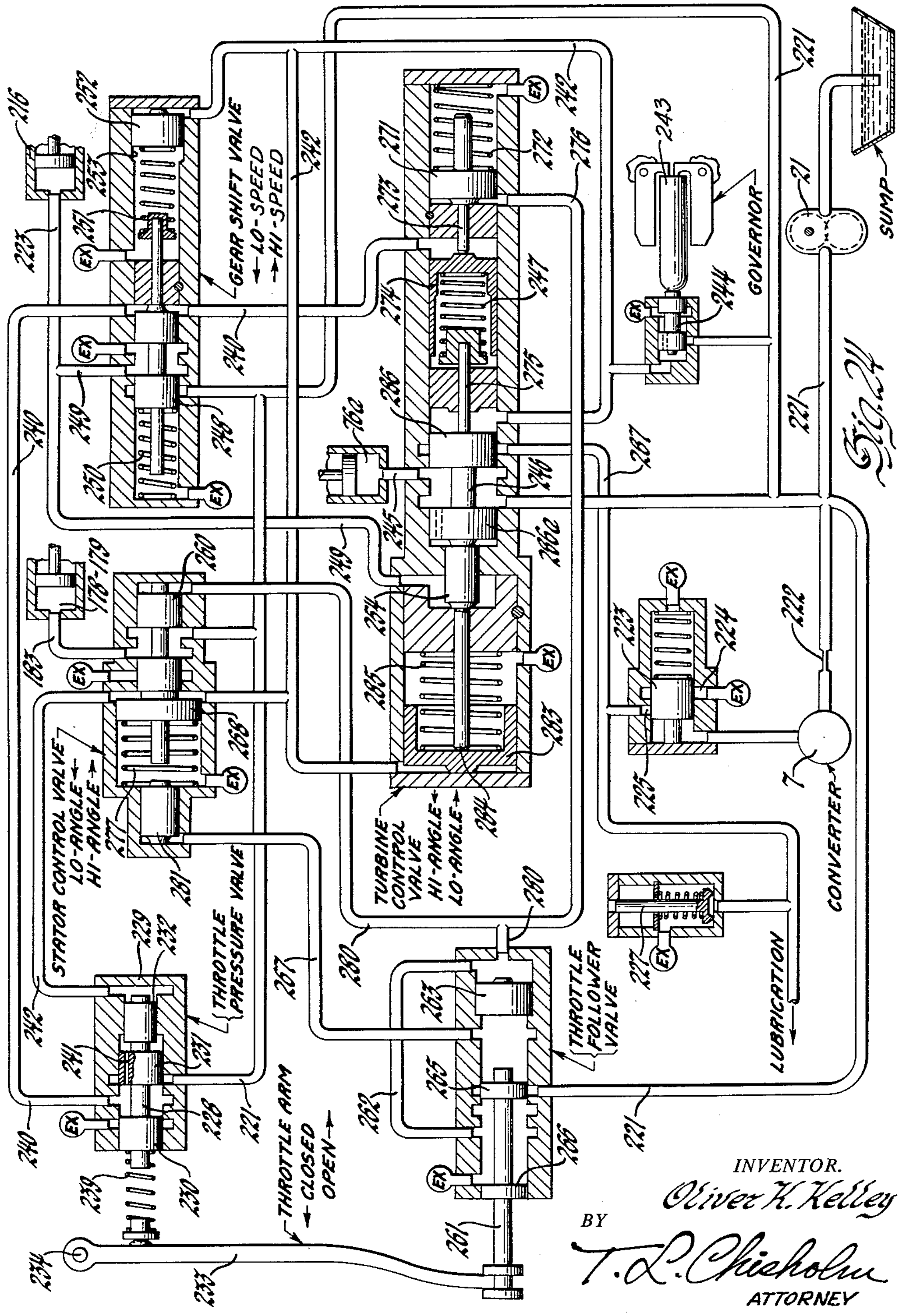
FIGURE 24 is a diagrammatic view of the transmission control system.

Referring now to FIGURE 24, there is diagrammatically shown a suitable control system wherein hydraulic fluid delivered from the pump 21 may be applied to control the blade pitch of the turbine T–1 and stator S, and the gear ratio of the reduction gear unit 2. As indicated in the lower right hand corner of FIGURE 24, the pump 21 receives fluid from the sump and discharges it through a main pressure line 221, to which is connected the converter shell 7 by a branch line having a flow reducing restriction 222. In the fluid return line from the converter is a conventional spring biased pressure relief valve 223 controlling ports 224 and 225 leading respectively to the sump and to the lubricating passages in the transmission via passage 226 in which the pressure may be regulated to a further reduced value as by a conventional spring loaded relief valve 227. This maintains a substantially constant pressure, below main line pressure, in the converter.

In the upper left hand corner of FIGURE 24 is shown a throttle-pressure valve in the form of a self-regulating piston type metering valve 228 slidably in a valve body 229. This valve 228 has spaced apart lands 230 and 231 and a piston 232. At 233 is indicated a manually controlled member whose position is responsive to throttle opening of the engine and which has a fixed pivot 234 about which it is movable with movement of the engine accelerator or other speed control regulator (not shown) from a minimum speed setting (idling) position shown in FIG. 24 toward the right to a maximum speed setting (above full throttle) position to apply increased biasing force to the valve 228 through a spring 239. The expression above full throttle as used herein and usually in the art means that the mechanism has fully opened the throttle, and has moved farther, without affecting throttle opening, to accomplish some other control function, as will be apparent from the explanation below. Movement of the throttle-pressure valve 228 to the right from its position shown operates to open main line 221 at land 231 and admit fluid from the main line 221 into a regulated pressure chamber connected to a metered pressure line 240 and movement to the left discharges fluid from the line 240 to the sump by the vent port EX. Opposing opening movement of the valve 228 is the metered line pressure acting at the right of land 231 by reason of the bleed passage 241 connecting the opposite ends of the land. Also acting in opposition to the biasing force of the spring 239 is the governor controlled pressure in the line 242 acting against the right hand end of the piston portion 232. Consequently the throttle pressure valve maintains a pressure in the throttle pressure line 240 which increases with increasing torque demand on the engine as indicated by amount of throttle opening. The throttle pressure also decreases with increasing speed of the car, as indicated by increasing governor pressure in line 242, as will be explained.

The governor controlled pressure in the line 242 is regulated by a conventional governor indicated at 243 rotated at a speed which is responsive to transmission output shaft speed and exerts a force, measured by car speed, on a second self-registering valve 244. With increase in output shaft speed the governor moves the valve 244 to the left from its position shown to increase the pressure in line 242 by admitting additional fluid thereinto from the main pressure line 221. Movement of valve 244 to the left uncovers the port connected to line 221 so that oil under pump pressure in this line enters the valve body between two piston-like end parts of valve 244. Such oil can pass through the orifice indicated by dotted lines in the left-hand piston part and continue into line 242, to be routed to various parts of the system. When the pressure in these parts develops to such an extent as to be applied to the left end of valve 244 with sufficient force to overcome the force of governor member 243, valve 244 is moved to the right, uncovering the exhaust port and permitting some of the oil in the developed head to be exhausted. This metering action continues with the result that as the member 243 increases the force moving valve 244 to the left, the resultant pressure head developed in line 242 and its connected parts increases, since higher pressure is required to move the valve 244 to the right against the action of the governor. The maximum pressure head developed cannot exceed the pressure of the pump 21.

At 246 is shown a turbine control valve in the form of a self-regulating valve which controls the pressure in the pipe 84 and turbine control chamber 76a by regulating the admission of fluid from the main pressure line 221 into the line 245 leading to supply pipe 84 (FIGURES 1 and 2). In the idling position of this valve 246, as shown, full main line pressure is delivered through the line 245, holding the T–1 turbine blades in their maximum angle position. Above idling speed, this valve 246 is sensitive to both governor controlled pressure in line 242 on piston 286 and throttle line pressure in line 240, from valve 228 on piston 274, both tending to increase the pressure of the turbine-control-fluid to increase the angle of the T–1 blades, with the force of the governor controlled pressure being applied directly thereto and that of the metered main line pressure being applied through a spring 247.

At 248 is shown a gear shift valve in the form of a spring biased normally closed valve which controls the admission of main line pressure to the line 249 to operate the brake piston 221 (FIGURE 1*a*) for locking the sun gear 203 in effecting a low torque multiplication in the gearset. The valve 248 is urged to open position against the closing force of its spring 250 by throttle pressure in the passage 240 and also by the governor pressure in the line 242, the force of the latter pressure being transmitted to the valve 248 through a spring 251 by a piston 252 whose movement in the opening direction of the valve 248 is limited by a stop shoulder indicated at 253.

When the gear shift valve 248 is opened, main line pressure (from line 221) is applied to the cylinder 216 (FIGURE 1*a*) and is also applied through the passage 249 to a small diameter piston portion 254 provided on the left hand end of the turbine control valve 246, with the result that the effective closing force acting on the valve 246 is increased, causing a reduction in the turbine-control-fluid pressure (line 245) and consequent establishment of the turbine T–1 blades in a lower angle simultaneously with the establishment of high-speed ratio in the gearset. The areas of the fluid pressure operating surfaces on the valves 246 and 248 and the biasing forces of the springs 247, 250 and 251 are so selected that upon movement of the manually controlled throttle member 233 from its minimum speed setting to its maximum speed setting, the force of the governor controlled pressure in the line 242 acting on piston 252 and on piston portion 286, plus the force of the metered main line pressure in the passage 240 applied to piston 274 to assist spring 247, on the valve 246 is sufficient to provide a turbine-control-fluid pressure effective to position the turbine T–1 blades in an intermediate angle setting such as is represented by the broken outline 42′ in FIGURE 23. As the governor controlled pressure increases with increase in output shaft speed, the turbine-control-fluid pressure increases accordingly to advance the blades 42 to their maximum angle position (shown in broken outline 42″ of FIGURE 23). Thus, with the throttle held in its maximum speed position, the blades 42 are initially advanced to their intermediate angle, from which they further advance toward their maximum angle as the speed of the output shaft increases. Then, when the force of the governor controlled pressure applied to piston 252 and acting through the spring 251 reaches a sufficientlly high value that its force (plus the force of the metered main line pressure) is sufficient to open the valve 248 and thereby cause the gear ratio to change from its high torque ratio to low torque ratio, the added closing force applied to the piston portion 254 by the main line pressure supplied by pressure supplied by line 249 effects a sufficient reduction in the turbine-control-fluid pressure that the turbine T–1 blades return to their intermediate angle. Without changing of the maximum speed setting of the manually controlled lever 233, the governor controlled pressure in line 242 will then continue to increase with still further increase in output shaft speed, resulting in the turbine-control-fluid pressure again building up and gradually returning the turbine T–1 blades to their maximum angle.

At 260 is shown a spring-opened valve which controls the application of main line pressure from the passage 221 to actuate the stator control piston 172 and thereby effect pivotal movement of the stator blades 148 from their low angle position shown in solid lines in FIGURE 23 to their high angle position shown in broken outline in FIGURE 23. Since it is desired that the stator blades be maintained in their low angle position during part throttle operation corresponding to intermediate positions of the manually controlled lever 233, suitable means is provided for effecting this result. As shown in FIGURE 24, a so-called detent or follower valve 261 is provided which is linked to move with the manually controlled lever 233 to admit main line pressure from the passage 221 into a branch passage 262 for application through the connecting passage 280 against the valve 260 in the direction to close off the flow of main line pressure to the stator piston 172. In the initial position of the follower valve 261 as shown, corresponding to the minimum speed of the lever 233, no such closing force is applied to the valve 260, and hence it remains in its open position as shown and maintains the stator in high angle. Upon initial movement of the lever 233 from its minimum speed setting, however, the follower valve 261 moves to the right and connects the branch passage 262 to the main line pressure in passage 221 so that main line pressure in passage 280 closes the valve 260 against the force of the spring 277. The main line pressure then existing in the branch passage 262 and on the right of piston 263 is effective to maintain piston 263 in abutment with a stop, represented by the shoulder 264, the left side of the piston being vented by the port EX. In this position the piston 263 resists movement of the manual lever 233 beyond its full throttle position with a force measured by main line pressure. This resisting action occurs just prior to the piston portions 265 and 266 of the follower valve interrupting communication between main line 221 and the branch passage 262 and establishing communication between main line 221 and a second branch passage 267. Upon applying the necessary additional force to displace the piston from its shoulder 264, main line pressure is admitted to the second branch passage 267 and acts against the piston 281 which then drives the valve 260 to its open position shown and main line pressure is again applied to stator piston 172, causing the stator blades 148 to move to their high angle setting shown in broken outline in FIGURE 23. As is known in the art, this increases the torque multiplication of the torque converter in response to an increase in torque demand on the engine.

The large piston portion 268 of the stator control valve 260 is subject at all times to the governor controlled pressure, tending to close this valve and thereby cause the stator blades to assume their low angle setting. The area of the piston portion 268 against which the governor controlled pressure acts is made sufficiently large that the governor controlled pressure will be effective both to prevent this valve from opening and thus maintain low stator angle in the event the throttle is closed while the output shaft is rotating at substantial speed, and to return this valve to closed position, and restore low angle as the output shaft reaches a predetermined high speed after it has been opened by movement of the lever 233 beyond full throttle as described in the preceding paragraph. Closure of the valve 260 at all normal output shaft cruising or road load speeds is desired because high torque multiplication is not needed and in order that the consequent low angle positioning of the stator blades will then offer a minimum impedance to the toroidal flow of the converter-fluid in either direction between the turbine T–2 and the impeller I, with the result that the tightest possible fluid coupling action (condition of minimum slip) between these elements will be obtained.

Referring again to the turbine-control-fluid pressure regulating valve 246, this valve may be maintained in its open position shown during engine idling by a spring 272 acting through a piston 271 and pin 273 to apply sufficient force for that purpose on the piston 274, spring 247 and pin 275. Under these conditions, full main line pressure from the passage 221, valve 246, line 245 and supply pipe 84 acts against the piston valve 99 (FIGURE 1) and the T-1 turbine blades are held in their maximum angle position shown in broken outline 42'' in FIGURE 23. Pressure for moving the piston 271 against the spring 272 to allow the turbine blades to pivot to an intermediate angle position when the manual control lever 233 is moved away from its minimum speed setting position, is provided by the passage 276 which connects through the branch passage 262 with the main line pressure passage 221 when the follower valve 261 is initially moved to the right from its position as shown. With main line pressure acting through the passage 276 against the piston 271 in this manner tht force of the spring 272 is relieved from the valve 246 and the latter is permitted to reach its self-registering position corresponding to the biasing force of the metered line pressure in the line 240 and the governor controlled pressure in the line 242. As is known in the art, whenever the valve 246 is open, fluid flows from main line 221 into the chamber between lands 286 and 286a and through the passage through land 286a shown in dotted lines in FIGURE 24. Pressure on the left hand 286a urges the valve to the right, and when the force of this pressure exceeds the sum of the forces tending to move the valve to the left, the valve closes by moving to the right, closing the entry from line 221 and uncovering the low pressure lubricating line 287 to relieve excess pressure. Relief of excess pressure lets the valve open again. This reduces the pressure on the left of land 286a so that its force is less than the sum of the opening forces (namely the force of governor pressure on piston 286, the spring 247 and throttle pressure on piston 274). This closes the relief line and again admits fluid from the main line. Thus the valve alternates or hovers between two positions, one in which the entry port from main line 221 is slightly open and the relief line 287 is closed, and the other in which the main line is closed and the relief line is slightly open. This maintains in the turbine control line 245 and the turbine control cylinder 76a a pressure which is measured by the sum of the opening forces on the valve 246, which forces increase with throttle opening, as has been explained.

Thus it will be seen that with both the stator control valve 260 maintained in its open position by the spring 277 and the turbine control valve 246 maintained open by the spring 272 while the manual controlled lever 233 is in its minimum speed setting position, the effect of both high angle stator blade pitch and maximum angle turbine blade pitch is obtained to resist vehicle creep at idle. If it be considered unnecessary in the application of this transmission to a particular vehicle that both of these anti-creep features be incorporated, the passage 276, together with its associated piston 271, spring 272 and pin 273 may be omitted, in which case only the high angle blade setting of the stator will be effective at idle for this purpose. Alternatively, the connecting passage 280 to the stator control valve 260 from the line 262 may be omitted and the right hand end of the large piston portion 268 be subjected to main line pressure in line 221 rather than to governor controlled pressure in line 242 as shown. With this latter arrangement, the stator blades will remain in their low angle position until the manual control lever 233 is moved to its maximum speed setting position, resulting in main line pressure being applied to the piston 281 and driving this valve 260 to the open position shown in FIGURE 24.

Since it is also desired for tight coupling action that the turbine T–1 offer a minimum impedance to the flow of converter-fluid between the turbine T–2 and impeller I during normal road load operation, suitable means is provided for maintaining the turbine-control-fluid pressure regulating valve 246 in its fully closed position under such conditions, so that the turbine T–1 blades will be in their minimum angle position. This is accomplished as shown in FIGURE 24 by providing for the governor controlled pressure to act on a piston 283 through a pin 284 to drive the valve 246 to its closed position when the output shaft speed reaches a road load value corresponding to any particular setting of the manual lever 233. The spring 285 prevents the piston 283 from acting on the valve 246 at low car speeds, that is until the force of governor pressure overcomes the spring 285. Thereafter movement of the piston 283 is resiliently opposed by the spring. The rate of the spring 285 and the area of piston 283 are so proportioned to the rate of spring 247 and areas of pistons 286 and 274 that closing of the valve 246 occurs whenever the resultant force of the governor control pressure on the valve 246 reaches a value sufficient to overcome the opposing force of metered line pressure in the passage 240.

In order that the turbine-control-fluid delivery passages to the valve 99 (FIGURES 1 and 2) afforded by the supply pipe 84, output shaft 6 and line 245 (FIGURE 24) will be maintained full when the valve 246 is held closed by governor controlled pressure as described in the preceding paragraph, the piston portion 286 of valve 246 is arranged to open the line 245 to the lubrication line 226 by branch line 287. By thus maintaining a charge of fluid in those passages at a relatively low pressure (insufficient to affect the blade pitch of turbine T–1) while the valve 246 is closed, a quick response to increased speed settings of the lever 233 is obtained when valve 246 is moved to the left, again establishing communication between pump supply line 221 and the turbine control fluid line 245.

From this description of the transmission and control system it will be observed that the driving input torque delivered by the impeller is so transmitted through the first and second turbines T–1 and T–2 and through the gearing to the transmission output shaft 6 that the acceleration of the latter under load is gradual and smooth, even during shift of ratio in the gearing. Efficient torque conversion is also obtained throughout each range of output shaft speed before and after this change in the T–1 turbine drive ratio is effected by reason of the fact that the blade pitch angle of the turbine T–1 is gradually increased in each instance as the turbine T–2 assumes its greater share of the load. By providing the means for increasing the blade angles of the stator above full throttle, the torque multiplication of the entire transmission can be increased which is desirable in obtaining maximum acceleration of the vehicle. Also, improved coupling efficiency of the converter at vehicle cruising speeds and effective anti-creep under idling conditions are realized.

*Résumé of operation*

*Engine idling.*—Referring to FIGURE 24, if the engine is idling with the throttle closed and the car is standing, the pump 21 supplies oil at standard line pressure through main line 221 to the inlet of the throttle pressure valve 228, which because its spring 239 is under minimum stress, regulates to provide minimum throttle pressure in the chamber between the lands 230 and 231 and in the throttle pressure line 240. There is no governor pressure on piston 232 in the throttle pressure valve because governor line 242 is vented through the valve 244 of the stationary governor 243, by way of the governor exhaust port EX.

The throttle follower valve 261 is held in the position shown in FIGURE 24 by the throttle link 233 so that its land 265 closes entry from the main line 221 and vents line 267 from the stator control valve 260 at vent port EX. This prevents closing pressure on piston 281 of the stator control valve. Also, conduit 262 is vented at the open left end of the throttle follower valve 261 adjacent its land 266, and this prevents pressure on the right of a hydraulic detent formed by free piston 263 in the throttle follower valve, vents opening line 280 of the stator control valve to prevent opening pressure at the right of stator control valve 260, and vents line 276 from the turbine control valve 246, preventing pressure on the spring control piston 271 in that valve.

This leaves the stator control valve 260 opened by spring 277, there being no governor pressure on piston 268 which would tend to close the valve. The open stator control valve 260 fills the high angle stator holding chamber 178—179 (FIGURE 2) at main line pressure, and this overcomes converter pressure on piston 172 and holds the stator vanes at high angle to prevent creep.

It also leaves the spring 272 of the turbine control valve free to hold open that valve through pin 273, piston 274, spring 247 and pin 275. There is no governor pressure on pistons 283 and 286 and the throttle pressure on piston 274 is low. The turbine control valve 246 now maintains full main line pressure in turbine control line 245 and in the turbine high angle holding chamber **76*a*** (FIGURE 2) which holds the turbine blades at maximum angle to prevent creep.

The gear shift valve 248 is closed by spring 250 against minimum throttle pressure on the right of the valve. This prevents fluid from entering the valve from main line 221 and vents the supply line 223 of the sun gear brake cylinder 216 (FIGURE 1*a*) so that the sun gear 203 can rotate backward. This conditions the transmission for low speed ratio or high torque ratio drive whenever the car is subsequently started.

*Starting the car.*—Referring to FIGURE 24, consider that the throttle has been opened slightly so that the throttle follower valve 261 has moved slightly to the right of the position shown in FIGURE 24. Its land 266 now closes the open left end of the throttle follower valve chamber and its land 265 has opened the entry port from the main line 221. Conduit 267 remains vented as when the engine was idling, and thus vents the opening chamber at the left of piston 281 of the stator control valve 260. Conduit 262 conducts oil from the throttle follower valve chamber by line 280 to the closing chamber at the right of stator control valve 260. This closes this valve against the spring 277, venting the high angle stator holding cylinder 178—179 (FIGURE 2) and placing the stator blades 148 in the low angle position shown in full lines in FIGURE 23. Also, oil at main line pressure from conduit 262 urges the throttle follower valve detent or piston 264 to the left. This provides a resistance against inadvertent kick-down as will be explained. Oil from conduits 262 and 280 also pressurizes conduit 276 and exerts pressure on piston 271 of the turbine control valve, compressing spring 272 and removing its force from the turbine control valve 246. This leaves the turbine control valve free to regulate the pressure in the turbine control conduit 245 and turbine control chamber **76*a* (FIGURE 2) at a value measured by the throttle pressure. Opening of the throttle has increased slightly the throttle pressure in line 240 and on the piston 274 of the turbine control valve 246 which adds opening force to the valve 246. This opening force at this low value of throttle pressure is less than the opening force on the valve formerly exerted by spring 272 when the space at the left of piston 271 was vented, and since this pressure is low the turbine control valve now maintains a low pressure in the turbine high angle holding chamber 76*a*** and this lets converter pressure hold the turbine blades at low angle.

Under the conditions just described, the engine exerts sufficient torque through the torque converter and gearing to start the car against low resistance, for example, when the car is on level ground. The stator blades and T–1 blades are at lowest angle and the planetary gear is in the highest torque ratio. The amount of torque delivered by the torque converter is regulated by the amount of throttle opening. Increase in throttle opening increases throttle pressure and this increases the force on the piston 274 in the turbine control valve 246 to increase the angle of the turbine blades with increasing torque demand.

*Sudden start.*—The car may be started with both high turbine angle and high stator angle by flooring the throttle pedal. When this occurs the linkage 233 moves the throttle follower valve 261 fully to the right and moves the piston or detent plug 263 fully to the right. This vents the stator valve closing chamber on the right of the valve stem 260 and pressurizes the opening chamber on the left of piston 281 which assures opening of the stator control valve and pressurizes the high angle stator holding chamber 178—179 to put the stator blades at high angle. It also removes pressure from the spring-holding piston 271 of the turbine control valve 246 so that the spring 272 holds the valve 246 wide open to deliver maximum turbine control pressure or line pressure to place the turbine blades at maximum angle. This starts the car with the torque converter delivering its maximum torque multiplication. After the car has attained some predetermined high speed, the governor pressure in the stator control valve 260 can close the valve to return the stator blades to low angle.

It may be undesirable to use this maximum torque multiplication in low gear ratio. It is noted that maximum throttle pressure in the opening chamber at the right of the stem of the gear shift valve 248 opens this valve against the closing spring 250 to brake the sun gear 203 against reverse rotation and place the planetary gear set in high speed ratio.

Assuming a normal start, as the car begins to move, the governor 243 generates pressure measured by the speed of the car in the governor line 242 and all control chambers connected to it. In the throttle pressure valve 228 this governor pressure on piston 232 opposes the spring 239 and assists throttle pressure in the line 240 in urging the throttle valve 228 closed. This decreases the throttle pressure in accordance with increase in car speed. Decreased throttle pressure reduces pressure in the turbine high angle holding chamber 76a—79. Since car speed is proportional to the speed of the second turbine T–2, this tends to reduce throttle pressure and first turbine blade angle as the speed of the second turbine increases. However, this tendency is opposed by governor pressure acting directly on land 286 of the turbine control valve, which increases turbine control pressure and blade angle of turbine T–1 as the speed of T–2 or the speed of the car increases. It is noted that governor pressure is also exerted on the left of piston 283 of the turbine control valve which can act on rod 284 to increase the closing force on turbine control valve 246 and thus reduce the control pressure and T–1 blade angle as car speed increases. It will be remembered that one of the objects of the invention is to increase the turbine angle with increasing speed of the car or of second turbine T–2. To permit this to occur within a limited range of speed the piston 283 is prevented from moving under the influence of governor pressure by a heavy spring 285 until a predetermined car speed is reached. When such high speed is reached the piston 283 overcomes the spring 285 and the larger area of the piston 283 exerts a larger closing force on the valve 246 than the opening force exerted on the valve by the governor pressure against the smaller piston 286. Thus above a predetermined car speed the turbine control valve is closed so that the pressure in the turbine control chamber 76a is reduced to minimum and the blades are returned to lowest angle.

*High gear.*—The car starts with the planetary gearset in high torque or low speed ratio unless the throttle is opened far enough to push the detent piston 263 to the right in FIGURE 24.

As car speed increases, governor pressure exerts increasing force on the piston 252 of the gear shift valve until at some predetermined speed the spring 251 is stressed enough to open the gear shift valve 248, admitting oil at main line pressure from main line 221 to the conduit 249 to set the brake 219—220 to hold the sun gear 203 against reverse rotation. This changes the speed ratio of the gearing from low to high or decreases the torque ratio of the gearing, as explained above.

When the conduit 249 is pressurized by opening the gear shift valve, oil at main line pressure is directed to the left of piston 254 of the turbine control valve. This adds a closing force to the valve 246 and reduces the turbine control pressure, reducing the angle of the turbine blades. Thus, the turbine blades are maintained at a lower range of angular position when the gearing is in high speed ratio than when it is in low speed ratio.

The condition just described can be maintained over various throttle openings up to full throttle, it being borne in mind that increasing torque demand, evidenced by increasing throttle opening, increases the throttle pressure which tends to increase blade angle of the turbine up to a particular throttle opening as determined by the skirt of the piston 274, and increasing car speed tends both to reduce throttle pressure and also tends to increase turbine control pressure and has the net effect of increasing the angle of the blades of T–1.

*Kick-down.*—During all operations from slightly open throttle to full throttle, the high angle hold cylinder 179 of the stator is vented by the stator control valve 260 which is held closed by pressure of the main line in the closing chamber at the right of that valve, so that the stator is at low angle. At full throttle the right end of the stem of the throttle follower valve 261 just touches the piston 263, which resists further movement because line pressure urges it toward the left. In response to very high torque demand, the throttle control mechanism is moved past wide-open throttle position by the operator and this pushes the piston 263 fully to the right against the end of the valve casing. Inadvertent movement of the throttle control past wide-open position is prevented by the pressure on the right side of piston 263 which must be deliberately overcome by the operator in forcing the throttle follower valve further to the right. When the throttle follower valve and piston are moved to the right as far as they will go, the land 266 is at the right of conduit 262 which is now vented through the open left end of the throttle follower valve. This vents conduit 276 and removes pressure from the piston 271 in the turbine control valve, allowing the spring 272 to exert opening force on the turbine control valve 246 to increase the angle of the turbine blades. This causes the turbine to deliver greater torque. Simultaneously, the conduit 280 and the closing chamber at the right of the stator control valve 260 are vented, and the opening chamber at the left of the piston 281 is charged at main line pressure from the line 267 which now is between lands 266 and 265, the latter of which blocks the exhaust port EX. This closes the stator control valve 260 provided the car speed is below a predetermined value, as will be explained, and moves the stator blades to high angle to provide further increase in torque multiplication in the torque converter.

It is noted that the governor pressure on the right of piston 268 opposes the valve opening force of main line pressure on piston 281. At some predetermined high value of speed, governor pressure can overcome main line pressure on the stator control valve and again closes the valve to place the stator in low angle. However, this leaves the turbine control valve undisturbed, and it continues to hold the turbine blades at high angle, unless the speed is of such value that the governor chamber adjacent piston 283 overcomes the governor chamber adjacent land 286, in which case, as explained above, the angle of the turbine blades will be reduced.

While the invention has been described and shown with reference to a preferred structural embodiment, this should be considered in its illustrative and not in a limiting sense, since it is appreciated that various changes may be made therein without departing from the scope and spirit of the invention as now to be claimed.

This application is a continuation of my application Serial Number 328,090, filed December 26, 1952, now abandoned.

What is claimed is:

1. A transmission comprising a stationary casing, a hydraulic torque converter having impeller, turbine and reaction wheels, each wheel being rotatable with respect to the casing and each including a series of circumferentially spaced fluid guiding blades and a blade support, said reaction wheel having its blades pivotally mounted in its rotatable support and having a blade shifting member rotatable relative both to the casing and to the reaction blade support, said blades of the reaction wheel having portions interengaging said shifting member such that rotation of said shifting member relative to said reaction blade effects pivotal movement of its blades relative to the reaction blade support, a cylinder formed by said reaction blade support, a piston slidably fitting said cylinder, interacting cam surfaces on said piston and on said blade-shifting member adapted to rotate the blade-shifting member when the piston is moved axially within the cylinder, and means for introducing fluid under pressure from said stationary casing to said rotatable cylinder to displace said piston and thereby rotate said shifting member and pivot said stator blades relative to their support.

2. A transmission comprising a hydraulic torque converter having rotatable impeller, turbine and stator wheels, each including a series of circumferentially spaced fluid guiding blades and a support, each of said turbine and stator wheels having its blades pivotally mounted in its support and each having a blade shifting member rotatable relative to its support, and separate fluid pressure actuatable members for rotatively moving said blade shifting members relative to their respective support, one of said fluid pressure actuatable members being rotatively coupled to its blade shifting member and having cam surfaces adapted to engage cam surfaces on its associated support to rotate the blade shifting member with respect to its support when the blade shifting member is moved axially, the other of said fluid pressure actuatable members being rotatively coupled to the support and having cam surfaces adapted to engage with cam surfaces on its associated blade shifting member to rotate the blade shifting member when said other fluid pressure actuatable member is moved axially.

3. A transmission comprising a hydraulic torque converter having rotatable impeller, first turbine, second turbine and stator wheels, each including a series of circumferentially spaced blades extending between inner and outer supports, concentric relatively rotatable torque transmitting tubes having flanges coupled to the outer supports of the first and second turbine wheels respectively, said first turbine wheel being interposed between the impeller and second turbine wheels and having its blades pivotally mounted on its supports for varying the torque absorption of the first turbine wheel relative to the second turbine wheel, a blade shifting ring journalled to the outer support of the first turbine wheel and pivotally connected to each of the first turbine blades, a cylinder member reciprocably and rotatably mounted on the inner tube flange, an axially yieldable rotatively rigid disk coupling said cylinder member to said ring, a cam fixed to said inner tube flange having helical cam surfaces, rollers journalled in said cylinder member and engaging said cam surfaces, means for introducing fluid at controlled pressures into said cylinder member to shift the same axially of said inner tube, said means including a fluid supply pipe extending longitudinally through said inner tube and defining an annular fluid return passage therebetween, a valve body within said inner tube having inlet and outlet ports communicating respectively with the interior of said pipe and said annular return passage and having a common inlet and outlet port communicating with the interior of said cylinder member, a self-registering piston valve reciprocably mounted in said body and responsive to fluid pressure in said pipe controlling said ports, and a resilient member urging said valve to a position closing said inlet port but yieldable in response to fluid pressure in said pipe to sequentially close said outlet port and open said common inlet and outlet port, and a reaction member for said resilient member reciprocable with said cylinder member.

4. A transmission comprising a housing, a hydraulic torque converter having a rotatable impeller, a rotatable turbine in direct fluid receiving relation with the impeller, said turbine having spaced fluid guiding blades and inner and outer supports defining the ends of the interblade spaces, pins interconnecting the supports and journalling the blades for rotation between the supports, a ring rotatable coaxially of the turbine and pivotally connected to each of said blades about axes laterally spaced from the axes of said pins, a disk rigidly connected to one of the supports, a tubular shaft having an enlargement at one end terminating in a flange fixedly secured to the disk, a cylinder slidably embracing the periphery of the flange and the periphery of the enlargement, an axially yieldable member rotatively coupling said cylinder to said ring, a plurality of circumferentially spaced rollers journaled in the cylinder for rotation about axes disposed radially of the cylinder, a cam ring rigidly connected to the flange having helical slots engaging the rollers, a generally cup-shaped valve body seated within the enlargement having its open end facing the opposite end of said shaft, a fluid supply pipe extending concentrically of said shaft and fitting the open end of said body, said pipe and shaft defining an annular fluid return passage therebetween, said body and enlargement having connecting ports communicating with the interior of the cylinder and said body having other ports communicating respectively with said return passage and the interior of said pipe, a piston valve slidably reciprocable in said body and controlling the opening and closing of said ports, said valve being movable in response to fluid pressure in said pipe to sequentially block communication between said return passage and the interior of the cylinder and to open communication between the interior of the cylinder and the interior of the pipe, a spring supported by the cylinder and resiliently opposing movement of the valve in response to fluid pressure in the pipe.

5. A transmission comprising a housing, a hydraulic torque converter having a rotatable impeller, rotatable first and second turbines in successive fluid receiving relation with the impeller and a one-way rotatable stator in fluid receiving relation with the second turbine, said first turbine and stator each having blades shiftable from a low angle to a high angle fluid receiving position, an output shaft coupled to the second turbine, a multi-speed gearing system for drivably connecting the first turbine to the second turbine at different predetermined speed ratios, and control means including a manually controlled member movable between low and high speed setting positions and a governor responsive to output shaft speed conjointly operable to shift said first turbine blades toward their high angle position to the extent necessary to maintain a driving connection between said first turbine and the output shaft in each gear ratio and to shift said stator blades from their low angle to their high angle position in response to moving said manually controlled member a predetermined extent toward its maximum speed setting.

6. A transmission comprising a supporting housing, a hydraulic torque converter, a planetary gear system and an output shaft driven by the gear system, said torque converter including an impeller, a first turbine having variable pitch blades in direct fluid receiving relation with the impeller and a second turbine in direct fluid receiving relation with the first turbine, said gear system including first and second annulus gears coupled respectively to said first and second turbines, first and second planet gears meshing with the respective first and second annulus gears, a common sun gear meshing with both said first and second planet gears, a carrier for said first planet gear coupled to said output shaft and to said second annulus gear, and a carrier for said second planet gear, a one-way brake locking said second planet gear carrier to the housing against rotation in the direction negative to the drive, a fluid pressure actuated brake for releasably locking said sun gear to the housing against rotation in the direction negative to the drive, a fluid pressure actuated member controlling the blade pitch of said first turbine, a source of fluid pressure and means for controlling the application of said fluid pressure to said pressure actuated brake and member in response to the speed and torque demands of said output shaft, said controlling means including an output shaft speed responsive governor, a manually movable member, and a fluid pressure regulating valve conjointly controlled by said manually movable member and said governor.

7. A transmission comprising a stationary housing, a hydraulic torque converter including a fluid-confining shell rotatably supported in said housing, an input shaft drivingly connected to said shell, concentric radially spaced sleeves defining a passage therebetween for converter-fluid entering the shell, the inner of said sleeves being fixed to the housing and the outer of said sleeves being rotatable with the shell, a converter-fluid supply pump having a pump body fixedly connecting said inner sleeve to the housing and a rotor driven by the outer sleeve, rotary impeller, turbine and stator units in fluid circulating relation with the shell, each having a plurality of circumferentially spaced blades between inner and outer supports, said impeller unit being rotatable with the shell, a tubular shaft driven by the turbine unit and extending coaxially through said inner sleeve, said shaft and inner sleeve having a clearance space therebetween, said stator unit having its blades pivotally mounted in supports, said stator unit having its outer support rotatably supported by said shaft and sleeves and having one-way brake means engageable with said inner sleeve to prevent rotation of the stator unit oppositely of the impeller unit, said stator unit outer support having a circular recess with concentric side walls forming an annular cylinder open at one end to the interior of said shell and communicating at its opposite end with said clearance space, an annular piston reciprocably guided in said cylinder for axial movement in response to the respective pressures in said shell and clearance space, a cam member journalled by the stator unit outer support and pivotally connected to each of the stator blades, said cam member and piston having interacting cam surfaces adapted to rotate the cam and piston relative to each other when they are moved axially relative to each other, and manually controlled means for connecting said clearance space to fluid pressure delivery from said pump whereby the pitch of the stator unit blades may be adjusted to vary the torque transmitted from the impeller unit to the turbine unit.

8. A transmission comprising a hydraulic fluid coupling unit including a rotary fluid driving impeller, a first turbine in direct fluid driven relation with the impeller having blades adjustably movable through a range from low to high angle pitch positions, a fluid pressure movable blade angle adjusting member for said first turbine, means yieldable biasing said member to its low blade angle adjusted position, a second turbine in direct fluid receiving relation with said first turbine, gear means limiting the maximum rotating speed of the first turbine relative to the speed of the second turbine, a source of fluid pressure, passage means for conducting fluid under pressure from said source to said member, and means responsive to the rotating speed of the second turbine for controlling the fluid pressure in said passage means whereby the pitch of said first turbine blades is increased with increasing speed of rotation of said second turbine to maintain the speed of the first turbine at said maximum relation to the speed of the second turbine.

9. A transmission, comprising a hydraulic fluid coupling unit including a rotary fluid driving impeller, a first turbine in direct fluid driven relation with the impeller having blades pivotally adjustable through a range of low, intermediate and high angle pitch positions and a second turbine in fluid receiving relation with the first turbine, a blade pivoting member rotatably mounted on said first turbine, a fluid pressure movable member rotatable with said blade pivoting member and movable axially and rotatably with respect to said first turbine to effect blade pivoting rotational movements of said blade pivoting member relative to said first turbine, means for applying controlled fluid pressure to one side of said pressure movable member to move it axially with respect to the first turbine, inner engaging cam surfaces on said pressure movable member and said first turbine to rotate the pressure movable member with respect to the turbine in response to axial movement and thereby to cause pivoting of the first turbine blades from their low angle position toward their high angle pitch position, and biasing means yieldably opposing movement of said pressure movable member in said direction.

10. A transmission comprising a hydraulic fluid coupling unit including a rotary driven impeller, a first turbine in direct fluid driven relation with the impeller having blades adjustably movable through a range from low to high angle pitch positions and a second turbine in fluid receiving relation with said first turbine, a fluid pressure movable blade adjusting member for the first turbine, means resiliently biasing said member to its low blade angle adjusted position, gear means drivingly connecting the second turbine to the first turbine at predetermined high and low speed ratios corresponding to respective high and low maximum speeds of the first turbine relative to the second turbine but accommodating rotation of the first turbine relative to the second turbine at less than said ratios, fluid pressure actuable means for changing the speed ratio of said gear means from "high" to "low", means yieldably opposing actuation of said pressure actuable means to its low speed ratio condition, a source of fluid pressure applicable to move said member from its low blade angle position to its high blade angle position and to actuate said pressure actuable means to its low speed ratio position, and means responsive to the rotating speed of the second turbine for controlling the application of said pressure to said member and actuable means whereby during rapid acceleration of the impeller relative to the second turbine the pitch of said turbine blades is increased gradually toward their high angle setting with increase in speed of the second turbine to a predetermined value while said gear means is maintained in its low speed ratio, and thence said turbine blades are returned to a lower angle setting substantially simultaneously with a shift of said gear means to its low speed ratio, and thence said turbine blades are again gradually moved toward their high angle setting with continued increase in speed of said second turbine.

11. In a transmission, a hydraulic torque converter comprising rotary impeller, turbine and stator elements in fluid circulating relation, a stationary housing, a shell enclosing the converter and rotatable with the impeller, an outer sleeve journalled in the housing and radially supporting the shell at one end of the converter, said outer sleeve having a flange securing the impeller to the shell and locating the stator in one axial direction, an inner sleeve extending coaxially through the outer sleeve and having its end outwardly of the converter fixed rigidly to the housing, a turbine driven shaft extending coaxially through said inner sleeve and terminating inwardly of the shell with a flange secured to the turbine and locating the stator in the opposite axial direction, said stator having variable pitch fluid guiding blades and a support pivotally supporting the inner ends of the blades, a one-way brake preventing rotation of stator oppositely of the impeller including an outer race member journalled on said inner sleeve and fixed to said support, said support having an annular recess constituting a fluid pressure cylinder, an annular piston fitted in said cylinder and guided for reciprocation longitudinally of the converter axis, a ring interconnecting the stator blades and journalled on said support, said ring and piston having interengaging portions effecting oscillatory rotation of the ring in response to reciprocation of the piston, and means for supplying hydraulic fluid under pressure for flow between said sleeves and into the converter shell and for flow between said inner sleeve and said shaft into said cylinder.

12. In a transmission, a hydraulic torque converter comprising a stationary casing, a rotatable reaction stator having spaced fluid guiding blades and a blade supporting means rotatable with respect to the casing, said blades being adjustably movable relative to the rotatable supporting means to different angular pitch relations to the direction of the driving fluid entering the inter-blade spaces of the stator, and means for adjustably moving said blades including a fluid pressure actuated piston rotatable with respect to the casing, rotationally fixed with respect to the blades supporting means and axially shiftable relative to the supporting means, a blade interconnecting member rotatable relative to the supporting means, a blade interconnecting member rotatable relative to the casing and to supporting means, said interconnecting member and piston being interengaged by cam members whereby axial motion of the piston relative to the support rotates the interconnecting member relative to the support, means for subjecting opposite ends of said piston to different fluid actuating pressures, and means for varying one of said actuating pressures.

13. A transmission comprising a stationary casing, a hydraulic torque converter having rotatable impeller, turbine and stator wheels, each including a series of circumferentially spaced fluid guiding blades and a blade carrying member, said stator wheel having its blades pivotally adjustable on its rotatable blade carrying member between positions which guide through a relatively large change of direction and a relatively small change of direction respectively torque transmitting fluid flowing between the turbine and impeller wheels, and stator blade controlling means including a source of fluid under hydrostatic pressure in said casing, a shiftable member rotatable with the stator with respect to the casing and mechanically connecting and controlling the pivotal movements of the stator blades, said shiftable member being movable by fluid pressure from said source toward its blade controlling position which guides the torque transmitting fluid through a large change of direction, and means operative in response to a predetermined turbine speed which controls the supply of fluid from said source to the shiftable member to move said shiftable member to its blade controlling position which guides the torque transmitting fluid through a relatively small change of direction.

14. A transmission comprising a hydraulic torque transmitting unit having an impeller and a plurality of relatively rotatable turbines in fluid circulating relation with the impeller, each having a series of circumferentially spaced fluid guiding blades and a blade carrying member, the turbine which first receives liquid from the impeller having its blades pivotally adjustable on its blade carrying member between positions of high angle and low angle with reference to a plane determined by the axis of rotation of the turbine and the leading edge of the blade, blade angle controlling means for said first turbine including a source of fluid under hydrostatic pressure, a shiftable member mechanically connecting and controlling the pivotal movements of said adjustable blades, said shiftable member being movable by fluid pressure from said source toward its high angle position, and means operative in response to a predetermined speed of said other turbine which directs pressure from said source to said shiftable member to move said shiftable member to its low pitch controlling position.

15. A hydraulic torque converter having rotatable impeller, turbine and stator wheels, each including a series of circumferentially spaced fluid guiding blades, said turbine wheel having its blades shiftable on its core member to different angular relationships with the direction of the fluid entering said turbine wheel, a blade shifting member operatively connected to said turbine blades and movable in opposite directions to increase and decrease the blade angle of said turbine wheel, fluid pressure means for moving said member in the blade angle increasing direction including a source of fluid pressure, a valve controlling the application of said fluid pressure to said member, said valve being adapted to be moved by fluid pressure from said source in the direction to admit fluid to said fluid pressure means, and means for moving the valve in the opposite direction in response to movement of said member in the direction which increases blade angle.

16. A hydraulic torque converter having rotatable impeller, turbine and stator wheels, each including supporting means and a series of circumferentially spaced fluid guiding blades, one of said wheels having its blades shiftable on its supporting means to different pitch relationships with the fluid entering said wheel, a blade shifting member operatively connected to said shiftable blades and movable in opposite directions respectively to increase and decrease said blade pitch, fluid pressure means for controlling the movement of said member including a source of fluid pressure connectible to move said member in the direction to decrease pitch and means for controlling the application of said pressure to said member, said last named means including a valve movable in response to fluid pressure of the source in the direction to apply fluid pressure to said member and being movable in the opposite direction to cut off the supply of fluid pressure to said member, said valve having a connection with said member resiliently opposing fluid pressure induced movement of the valve and effective to move the valve in its opposite direction in response to movement of said member in the direction to increase pitch in its opposite direction.

17. A transmission comprising a hydraulic fluid coupling unit including a rotary impeller, a first turbine adapted to receive fluid circulated by the impeller and having blades angularly movable from low to high angle positions and a second turbine in fluid receiving relation with the first turbine, a fluid pressure movable blade adjusting member for the first turbine, means yieldably biasing said member to its low blade angle position, a source of fluid pressure applicable to move said member to its high blade angle position in opposition to said biasing means, and means responsive to the rotating speed of the second turbine for controlling the application of said pressure to said member, said last named means including a valve body provided with a bore having a fluid supply opening adjacent one end connected to the source and a fluid pressure delivery port spaced longitudinally of said bore from said opening, a piston valve slidably fitting said bore and controlling said port, said valve being movable in the port uncovering direction in response to the fluid pressure at said opening, and a spring interconnecting said valve and said member tending to resiliently oppose the uncovering of said port by the piston valve.

18. A hydrodynamic torque transmitting device comprising in combination rotatable impeller and turbine wheels, one of said wheels having pivoted blades, a torque transmitting member connected to said one wheel, an axially yieldable circumferentially rigid diaphragm connected to the blades so as to swing the blades when the diaphragm is rotated with respect to the torque transmitting member, an axially movable control member secured to the diaphragm, and interacting cam surfaces on the control member and on the torque transmitting member adapted to rotate the control member with respect to the torque transmitting member when the control member is moved axially.

19. Apparatus as defined in claim 18 in which the torque transmitting member and the axially movable contral member define an expansible chamber adapted to move the control member axially with respect to the torque transmitting member when fluid under pressure is admitted to the chamber.

20. A power transmission mechanism including in combination a stationery support, a rotatable power input shaft; manually operated means for controlling the speed of said input shaft; a fluid torque converter comprising an impeller driven by said input shaft, a turbine element, and a member which is at times rotatable with respect to the casing and having pivotally mounted blades angularly adjustable to either of two positions with respect to a plane through the rotative axis of the torque converter and means operatively connecting said blades and said input shaft speed controlling means for holding the blades in either of said positions in response to torque demand.

21. A torque converter comprising in combination a stationary casing, an impeller member, a turbine member and a reaction member which is freely rotatable in one direction with respect to the casing and is located between the impeller and the turbine, said members constituting means for circulating hydrokinetic torque-transmitting liquid, reaction blades pivotally mounted on the reaction rotatable member, and adapted to be placed in either of two positions, one in which the blades change through a relatively large angle the direction of liquid flowing between the turbine and impeller and the other in which the blades change through a relatively small angle the direction of liquid flowing between the turbine and impeller, the torque converter including means constantly urging the blades to one of said positions, a source of fluid under hydrostatic pressure in the casing, a rotatable fluid pressure motor for opposing the urging means and holding the blades in the other of said positions, and means for selectively supplying or preventing the supply of fluid from the stationary source to said rotatable motor and thereby rendering the opposing means effective or ineffective to oppose the urging means.

22. A transmission driven by an engine and including a stationary casing, a torque converter, an impeller member, a turbine member connected to the engine and a reaction member which is freely rotatable in one direction with respect to the casing and is located between the impeller and the turbine, said members constituting means for circulating hydrokinetic torque transmitting liquid, reaction blades pivotally mounted on the rotatable reaction member, and adapted to be placed in either of two positions, one in which the blades change through a relatively large angle the direction of liquid flowing between the turbine and impeller and the other in which the blades change through a relatively small angle the direction of liquid flowing between the turbine and impeller, the torque converter including means constantly urging the blades to one of said positions, a source of fluid under hydrostatic pressure in said casing, a fluid pressure motor rotatable with respect to the casing for opposing the urging means and holding the blades in the other of said positions, manually operated means for controlling the power developed by the engine, and means responsive to the power demand on the engine for selectively supplying or preventing the supply of fluid from the casing to said motor and thereby rendering the opposing means effective or ineffective to oppose the urging means.

23. A power transmission mechanism having a source of rotating power, means to control the speed of said power source, a plural element torque converter of the type including an impeller connected to said source of rotating power, a turbine member, and a reaction member having angularly adjustable blades, said impeller, turbine member and reaction member circulating fluid in a circuit, a control mechanism for said blades, said mechanism including a fluid pressure motor connected to said reaction member to move the blades of said reaction member to vary the angle of each blade relative to a plane through the rotative axis of the torque converter, a pump which supplies fluid under pressure, a first fluid pressure supply passage for connecting said pump and said motor, a second fluid passage connecting the torque converter fluid circuit and said motor to deliver torque converter fluid pressure to oppose the action of pump pressure on said motor, a valve member interposed in said first pressure supply passage intermediate said pump and said motor, said valve having a first position in which fluid from said pump is delivered to said motor to move said blades to a first torque multiplying position, said valve having a second position venting said motor to permit the torque converter fluid pressure to move said stator blades to a second torque multiplying position, and means connecting said valve and said speed control means whereby said stator blades may be selectively positioned in either of said positions in response to the position of the speed control means.

24. A power transmission mechanism having in combination an engine, an engine output shaft, an accelerator member for controlling the speed of said engine, a plural element torque converter of the type including an impeller connected to said shaft, a turbine member, and a reaction member having multi-position blades, said impeller, turbine member, and reaction member circulating fluid in a circuit, a control mechanism for said blades, said mechanism including a fluid pressure motor connected to said reaction member to change the angle of each blade relative to a plane through the axis of rotation of the torque converter, a pump supplying fluid under pressure, a first fluid pressure supply passage connecting said pump and said motor, a second fluid passage connecting the torque converter fluid circuit and said motor to deliver torque converter fluid pressure to oppose the action of pump pressure on said motor, a valve member interposed in said first pressure supply passage intermediate said pump and said motor, said valve being urged toward a first position delivering fluid from said pump to said motor with pressure sufficient to move said stator blades to a first torque-multiplying position, said valve having a second position venting said motor to permit the torque converter fluid pressure to move said stator blades to a second torque-multiplying position, a motion-transmitting device connecting said valve and said accelerator member, said accelerator member being operable to move said valve to said second position when said accelerator member is moved to a predetermined position.

25. A fluid torque converter mechanism including an impeller, a turbine member receiving fluid from said impeller, a rotatable reaction member having adjustable blades, said reaction member receiving fluid from said turbine member and redirecting it to said impeller, a power input shaft connected to said impeller, a power output shaft drivingly connected to said turbine member, an annular hub for the reaction member concentrically disposed about said output shaft, an annular piston mounted within said hub and operably connected to said blades to determine the angle of each blade with respect to a plane through the rotative axis of a torque converter, the torque converter including means for urging said piston toward a first position in which said blades cause one degree of change of direction of the fluid between turbine member and impeller, a second means for urging said piston toward a second position in which said stator causes a different degree of change of direction of the fluid leaving said turbine member, and manually controlled means for rendering said first means ineffective to urge said piston to said first position.

26. In a motor vehicle, in combination an engine, an output shaft, a power transmission for transmitting torque from the engine to the output shaft at varying torque ratios, the transmission including a hydrodynamic torque transmitting device having impeller, turbine and reaction members adapted to circulate working liquid between them, one of the members having blades whose angles are adjustable with respect to radial and axial planes extending through the respective blades, and means responsive to operation of the engine combined with absence of rotation of the output shaft for positioning the blades at high angle.

27. In a motor vehicle, in combination an engine, an output shaft, a power transmission for transmitting torque from the engine to the output shaft at varying torque ratios, the transmission including a hydrodynamic torque transmitting device having impeller and turbine rotors adapted to circulate working liquid between them, one of the rotors having blades whose angles are adjustable with respect to radial and axial planes extending through the respective blades, and means responsive to operation of the engine combined with forward motion of the vehicle above a predetermined speed for positioning the blades at low angle.

28. In a motor vehicle, in combination an engine, an output shaft, a power transmission for transmitting torque from the engine to the output shaft at varying torque ratios, the transmission including a hydrodynamic torque transmitting device having impeller and turbine rotors adapted to circulate working liquid between them, one of the rotors having blades whose angles are adjustable with respect to radial and axial planes extending through the respective blades, means responsive to operation of the engine combined with forward motion of the vehicle above a predetermined speed for positioning the blades at low angle and means responsive to torque demand on the engine for positioning the blades at high angle.

29. In a motor vehicle, in combination an engine, an output shaft, a power transmission for transmitting torque from the engine to the output shaft, control means for the engine and transmission, the transmission including a hydrodynamic torque transmitting device having an impeller adapted to circulate working liquid through a turbine and through a reaction member having blades whose angles are adjustable with respect to the direction of liquid flowing for the turbine, means responsive to operation of the engine for positioning the blades at high angle and means responsive to conditioning the control for rotation of the output shaft for positioning the blades at low angle, and means responsive to torque demand on the engine for positioning the blades at high angle.

30. In a motor vehicle, in combination an engine, an output shaft, a power transmission for transmitting torque from the engine to the output shaft, control means for the engine and transmission, the transmission including a hydrodynamic torque transmitting device having an impeller adapted to circulate working liquid through a turbine and through a reaction member having blades whose angles are adjustable with respect to the direction of liquid flowing from the turbine, means responsive to operation of the engine for positioning the blades at high angle and means responsive to conditioning of the control for rotation of the output shaft for positioning the blades at low angle, and manually operable means for positioning the blades at high angle.

31. A hydrodynamic torque transmitting device which circulates liquid to transmit torque from an input element driven by an engine to an output element comprising in combination, means in the path of the liquid having angularly adjustable surfaces, the torque transmitting device including means yieldingly urging the surfaces toward a first angular position, an expansible chamber motor for opposing the urging means, and means responsive to forward rotation of the output element above a predetermined speed for supplying to the chamber of said motor fluid at a pressure sufficient to overcome the urging means and to move the blades to a second angular position and means responsive to the torque demand on the engine for removing said supply of fluid and venting the chamber.

32. A hydrodynamic torque transmitting device which circulates a liquid to transmit torque from an input element driven by an engine rotatable at varying speed to an output element comprising in combination, means in the path of the liquid having angularly adjustable surfaces adapted to vary the rate of liquid circulating the device, and means responsive to stopping of the output element while the engine rotates at idling speed for moving the surfaces to restrict circulation of the liquid.

33. A torque converter comprising an impeller, a first turbine member, a second turbine member, and a rotatable stator element having pivotally mounted adjustable blading, a driving shaft connected to said impeller, an output shaft connected to said second turbine member, a torque multiplying mechanism connected to and driven by said first turbine member, said mechanism also being drivingly connected to said output shaft, the turbine members being so constructed and arranged that the torque transmitted through said converter during one phase of operation is divided between said members, and hydraulically operated manually controlled means for selectively positioning said stator blading in a low angle-low torque multiplying position or a high angle-high torque multiplying position.

34. A torque converter comprising an impeller, a first turbine member, a second turbine member, and a rotatable stator element having pivotally mounted multiposition blading, a driving shaft connected to said impeller, means for controlling the speed of said driving shaft, an output shaft connected to said second turbine member, a torque multiplying mechanism connected to and driven by said first turbine member, said mechanism also being drivingly connected to said output shaft, the turbine members being so constructed and arranged that the torque transmitted through said converter during one phase of operation is divided between said members, and hydraulically operated servo means for moving said stator blading to a low angle-low torque multiplying position or a high angle-high torque multiplying position, said servo means being operatively controlled by said input shaft speed controlling means to select the stator blading position.

35. A torque converter comprising an impeller, a first turbine member, a second turbine member, and an adjustable rotatable stator element having a low angle and a high angle position, a driving shaft connected to said impeller, an output shaft connected to said second turbine member, a planetary gearset interposed between said first turbine and said output shaft, said gearset including a sun gear, a one-way brake mechanism adapted to brake said sun gear against reverse rotation relative to said impeller, an annulus gear driven by said first turbine member and a planet carrier drivingly connected to said second turbine member, and manually operated hydraulically actuated means for selectively positioning said stator element in the low angle-low torque multiplying position or the high angle-high torque multiplying position.

36. A power transmission mechanism including a rotatable input shaft, means for transmitting power to the input shaft, a regulator for controlling the power transmitted to the input shaft, a torque converter including an impeller rotated by the input shaft, a turbine member and a rotatable reaction member having pivotally mounted blades adjustable to a position having a low exit angle and to a position having a high exit angle relative to a plane through the axis of rotation of the torque converter, said reaction member receiving fluid from said turbine member and redirecting said fluid into said impeller, the torque converter including a first fluid pressure means for urging the blades toward the low angle position, a second fluid pressure means for opposing said first fluid pressure means with force sufficient to move the blades to the high angle position, and means controlled by the regulator for rendering the second fluid pressure means completely inoperative.

37. In a plural element torque converter of the type including an impeller, a turbine and a reaction member having controllable blades in which the angular position of the reaction blades is variable by a hydraulic control mechanism, said impeller, turbine and reaction member circulating fluid in a circuit, said mechanism including a servo device operatively connected to said blades to move each blade to vary its angle relative to planes through the blade and through the axis of rotation of the torque converter, a pump supplying fluid under pressure, a first fluid pressure supply passage for connecting said pump and said servo device, a second fluid passage connecting the torque converter fluid circuit and said servo device to deliver fluid at the pressure of the torque converter to oppose movement of the blade under the influence of pump pressure, a valve in said first pressure supply passage between said pump and said servo device, said valve having a first position in which fluid from the pump is delivered to said servo device to hold said reaction blades in a first torque multiplying position, said valve having a second position interrupting communication between said pump and said servo device and venting said servo device to enable the torque converter fluid pressure to hold said reaction blades in a second torque multiplying position.

References Cited in the file of this patent

UNITED STATES PATENTS

| | | |
|---|---|---|
| 2,205,794 | Jandasek | June 25, 1940 |
| 2,292,482 | Roche | Aug. 11, 1942 |
| 2,327,647 | Jandasek | Aug. 24, 1943 |
| 2,333,253 | Jandasek | Nov. 2, 1943 |
| 2,354,596 | Jandasek | July 25, 1944 |
| 2,612,755 | Szczeniowski | Oct. 7, 1952 |
| 2,616,309 | Russell | Nov. 4, 1952 |

FOREIGN PATENTS

| | | |
|---|---|---|
| 444,171 | Great Britain | Mar. 16, 1936 |

UNITED STATES PATENT OFFICE

CERTIFICATE OF CORRECTION

Patent No. 2,995,955 August 15, 1961

Oliver K. Kelley

It is hereby certified that error appears in the above numbered patent requiring correction and that the said Letters Patent should read as corrected below.

Column 1, line 67, for "thoe" read -- the --; column 2, line 54, for "shafto" read -- shaft --; line 66, for "ringe" read -- ring --; column 8, line 49, for "otuside" read -- outside --; column 9, line 1, after "sleeve" insert -- 26 --; column 14, line 36, for "sufficientlly" read -- sufficiently --; line 42, strike out "pressure supplied by"; same column 14, line 70, after "speed" insert -- setting --; column 15, line 67, for "tht" read -- the --; column 16, line 1, for "hand" read -- of land --; column 23, line 6, for "with" read -- within --; line 39, for "yieldable" read -- yieldably --; column 24, lines 13, 15, 19, and 22, for "actuable", each occurrence, read -- actuatable --; line 73, for "blades" read -- blade --; same column 24, lines 74 and 75, strike out "a blade interconnecting member rotatable relative to the supporting means,"; column 26, lines 51 and 52, for "contral" read -- control --; line 58, for "stationery" read -- stationary --; column 27, line 1, for "reaction rotatable" read -- rotatable reaction --.

Signed and sealed this 6th day of February 1962.

(SEAL)

Attest:

ERNEST W. SWIDER
Attesting Officer

DAVID L. LADD
Commissioner of Patents